(12) United States Patent
John et al.

(10) Patent No.: US 7,333,264 B2
(45) Date of Patent: Feb. 19, 2008

(54) PHOTONIC BANDGAP MATERIALS BASED ON SILICON

(76) Inventors: Sajeev John, 1087 Staghorn Court, Mississauga (CA) L5C 3R2; Benjamin Emmanuel Chomski, 30 McEwen Avenue, Apt. #704, Ottawa (CA) K2B 5K8; Alan Geoffrey Ozin, 63 Gormley Avenue, Toronto (CA) M4V 1Y9; Ceferino Lopez Fernandez, Avenida de Castilla la Mancha, 33, B-1, San Sebastian de los Reyes, Madrid (ES) E-28700; Francisco Javier Meseguer Rico, Avenida del Saler, flat 26th, Valencia (ES) E-46013

( * ) Notice: Subject to any disclaimer, the term of this patent is extended or adjusted under 35 U.S.C. 154(b) by 0 days.

(21) Appl. No.: 11/285,218

(22) Filed: Nov. 23, 2005

(65) Prior Publication Data

US 2006/0209393 A1   Sep. 21, 2006

Related U.S. Application Data

(63) Continuation of application No. 10/182,448, filed as application No. PCT/CA01/00049 on Jan. 24, 2001, now abandoned.

(60) Provisional application No. 60/178,773, filed on Jan. 28, 2000.

(51) Int. Cl.
    *H01S 3/00* (2006.01)
(52) U.S. Cl. .................................. 359/341.1
(58) Field of Classification Search .............. 216/56; 359/341.1
    See application file for complete search history.

(56) References Cited

U.S. PATENT DOCUMENTS 3,497,367 A   2/1970   Gaskin et al.
4,983,369 A   1/1991   Barder et al.

(Continued)

FOREIGN PATENT DOCUMENTS

JP          5139717         6/1993

(Continued)

OTHER PUBLICATIONS

Palacios-Lidon et al. Optical Study of the full photonic band gap in silicon inverse opals. Applied Physics Letters. vol. 81. No. 26. Dec. 23, 2002.*

(Continued)

*Primary Examiner*—Deandra M Hughes
(74) *Attorney, Agent, or Firm*—Lynn C. Schumacher; Hill & Schumacher

(57) ABSTRACT

Method of synthesis of photonic band gap (PBG) materials. The synthesis and characterization of high quality, very large scale, face centered cubic photonic band gap (PBG) materials consisting of pure silicon, exhibiting a complete three dimensional PBG centered on a wavelength of 1.5 µm. This is obtained by chemical vapor deposition and anchoring of disilane into a self-assembling silica opal template, wetting of a thick silicon layer on the interior surfaces of the template, and subsequent removal of the template. This achievement realizes a long standing goal in photonic materials and opens a new door for complete control of radiative emission from atoms and molecules, light localization and the integration of micron scale photonic devices into a three-dimensional all-optical micro-chip.

36 Claims, 12 Drawing Sheets

U.S. PATENT DOCUMENTS

| | | | |
|---|---|---|---|
| 5,471,180 A * | 11/1995 | Brommer et al. | 333/202 |
| 5,600,483 A | 2/1997 | Fan et al. | |
| 6,261,469 B1 * | 7/2001 | Zakhidov et al. | 216/56 |
| 6,409,907 B1 * | 6/2002 | Braun et al. | 205/317 |

FOREIGN PATENT DOCUMENTS

| | | |
|---|---|---|
| JP | 6087608 | 3/1994 |
| WO | 0021905 | 4/2000 |

OTHER PUBLICATIONS

Mizeikis et al. Three-Dimensional woodpile photonic crystal templates for the infrared spectral range. Optics Letters. vol. 29, No. 17. Sep. 1, 2004.*

Li et al. Photonic Bandgaps in Disordered Inverse-Opal Photonic Crystals. Advanced Materials. 13, 721 (2001).*

John et al. Photonic Bandgap Formation and Tunability in Certain Self-Organizing Systems. Journal of Lightwave Technology, vol. 17, No. 11, Nov. 1999.*

Busch et al., K. "Photonic band gap formation in certain self-organizing systems", Physical Review E. Statistical Physics, Plasmas, Fluids, and Related Interdisciplinary topics, US, American Institute of Physics, New York, NY, vol. 58, No. 3, Sep. 1998, pp. 3896-3908.

Baughman, et. al., R.H., "Nanostructured Thermoelectrics based on Periodic Composites from Opals and Opal Replicas: I, Bi-Infiltrated Opals" International Conference on Thermoelectrics, 1998, pp. 288-293.

Miguez et al., H. "Control of the Photonic Crystal Properties of FCC-Packed Submicrometer S102 Spheres by Sintering" Advanced Materials, De, VCH Verlagsgesellschaft, Weinheim, vol. 10, No. 6, Apr. 16, 1998, pp. 480-483.

Chomski et al., E. "Panoscopic silicon-a material for "all" length scales" Advanced Materials, Jul. 19, 2000, VCH Verlagsgesellschaft, Germany, vol. 12, No. 14, pp. 1071-1078.

Stober et al., W. "Controlled Growth of Monodisperse Silica Spheres in the Micron Sizerange" Journal of Colloid and Interface Science, Academic Press, New York, N.Y., US, vol. 26, 1968, pp. 62-69.

John et al. Photonic Bandgap Formation and Tunability in Certain Self-Organizing Systems. Journal of Lightware Technology, vol. 17, No. 11, Nov. 1999.

Labrosse et al., A. "Characterization of porosity of ammonia catalysed alkoxysilane silica", Journal of Non-Crystalline Solids, North-Holland Physics Publishing, Amsterdam, NL, vol. 221, No. 2-3, Dec. 1, 1997 pp. 107-124.

* cited by examiner

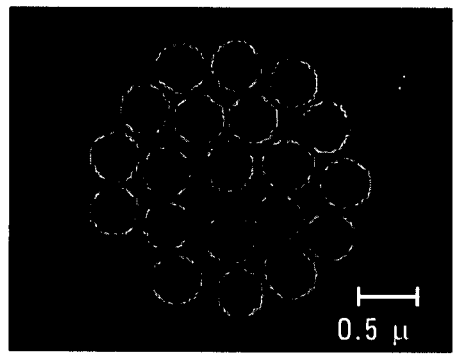
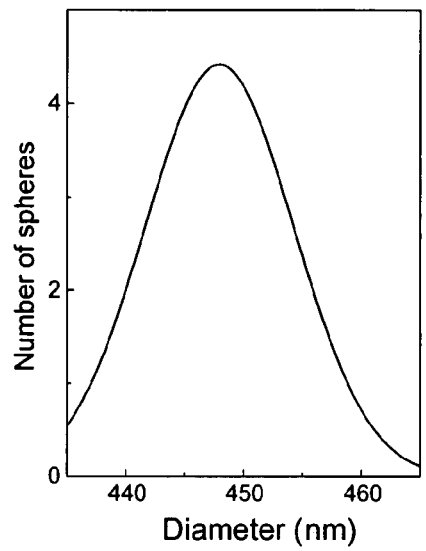
Figure 1
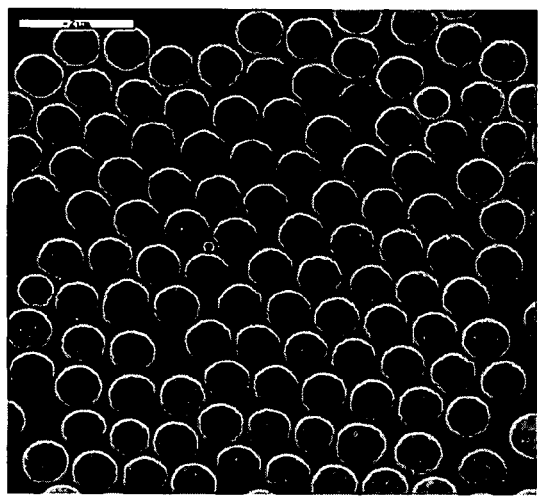
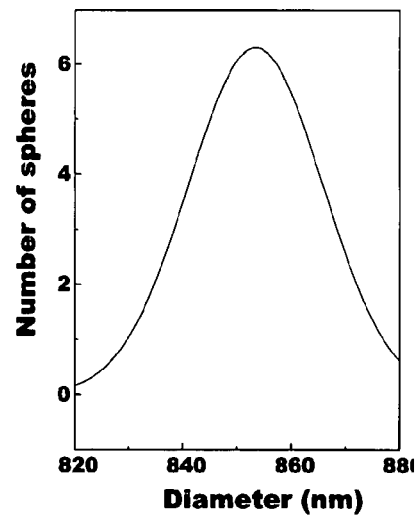
Figure 2

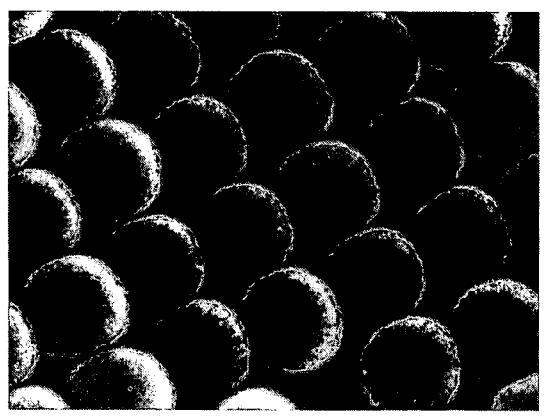 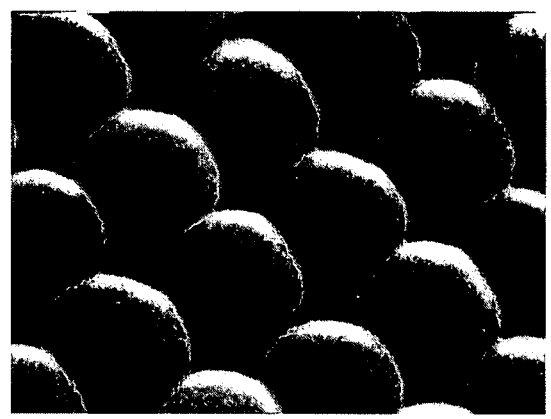
Figure 9a                    Figure 9b

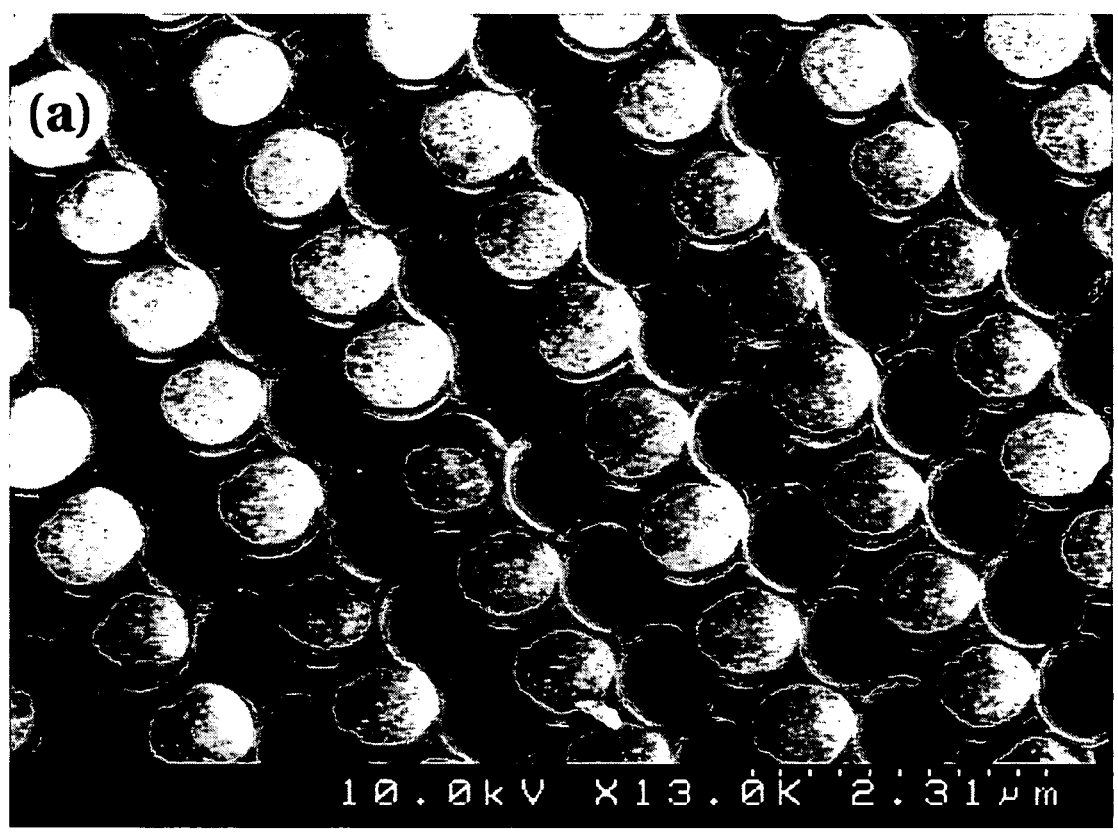
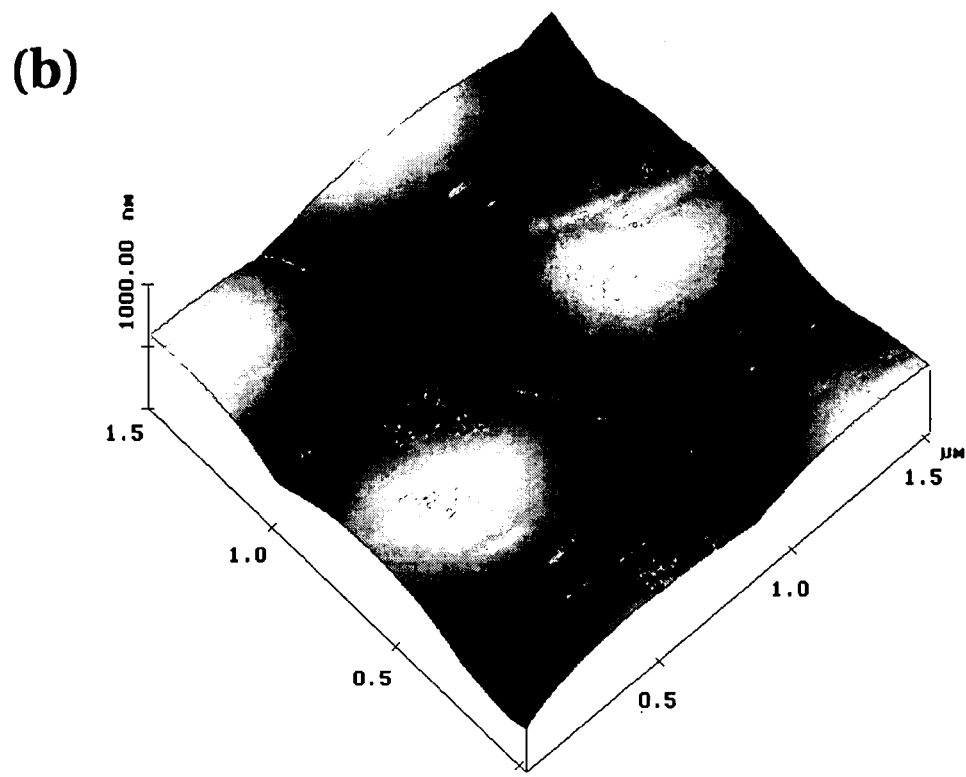
Figure 10

PHOTONIC BANDGAP MATERIALS BASED ON SILICON

This application is a Continuation of U.S. application Ser. No. 10/182,448, filed 2002 Jul. 29, which is a National Stage application of PCT/CA01/00049, filed 2001 Jan. 24 which is a Non-provisional application of Provisional U.S. application Ser. No. 60/178,773 filed 2000 Jan. 28.

FIELD OF THE INVENTION

The present invention relates to a method of synthesis of periodic composite materials of silicon and another material with a dielectric constant less than silicon, and more particularly the invention relates to photonic band gap (PBG) materials based on silicon having complete photonic bandgaps.

BACKGROUND OF THE INVENTION

Photonics is the science of molding the flow of light. Photonic band gap (PBG) materials, as disclosed in S. John, Phys. Rev. Lett. 58, 2486 (1987), and E. Yablonovitch, Phys. Rev. Lett. 58, 2059 (1987), are a new class of dielectrics which carry the concept of molding the flow of light to its ultimate level, namely by facilitating the coherent localization of light, see S. John, Phys. Rev. Left. 53, 2169 (1984), P. W. Anderson, Phil. Mag. B 52, 505 (1985), S. John, Physics Today 44, no. 5, 32 (1991), and D. Wiersma, D. Bartolini, A. Lagendijk and R. Righini, Nature 390, 671 (1997). This provides a mechanism for the control and inhibition of spontaneous emission of light from atoms and molecules forming the active region of the PBG materials, and offers a basis for low threshold micro-lasers and novel nonlinear optical phenomena. Light localization within a PBG facilitates the realization of high quality factor microcavity devices and the integration of such devices through a network of microscopic wave-guide channels (see J. D. Joannopoulos, P. R. Villeneuve and S. Fan, Nature 386, 143 (1998)) within a single all-optical microchip. Since light is caged within the dielectric microstructure, it cannot scatter into unwanted modes of free propagation and is forced to flow along engineered defect channels between the desired circuit elements. PBG materials, infiltrated with suitable liquid crystals, may exhibit fully tunable photonic band structures [see K. Busch and S. John, Phys. Rev. Left. 83, 967 (1999) and E. Yablonovitch, Nature 401, 539 (1999)] enabling the steering of light flow by an external voltage. These possibilities suggest that PBG materials may play a role in photonics, analogous to the role of semiconductors in conventional microelectronics. As pointed out by Sir John Maddox, "If only it were possible to make dielectric materials in which electromagnetic waves cannot propagate at certain frequencies, all kinds of almost magical things would be possible." John Maddox, Nature 348, 481 (1990).

The single biggest obstacle to the realization of these photonic capabilities is the lack of a proven route for synthesis of high quality, very large-scale PBG materials with significant electromagnetic gaps at micron and submicron wavelengths. The method of micro-fabrication must also allow the controlled incorporation of line and point defects, for optical circuitry, during the synthetic process.

One very promising material for use in producing photonic devices is silicon. Producing photonic devices from silicon-based photonic crystals would be a very significant commercial advantage since methods of fabricating such materials could be readily retrofitted into existing silicon chip fabrication facilities.

Nature produces optically unique materials based on silica. Specifically, opals are semiprecious stones used in jewellery and decoration. The structure of naturally occuring opals was discovered for the first time in 1964 [J. V. Sanders, Nature 1964]. They are macroporous materials made by a periodic distribution of silica submicrometer spheres embedded in a silica medium with a slightly different refractive index. They present iridescent colors due to Bragg diffraction of light as a consequence of the three dimensional periodic modulation of the dielectric contrast in the structure. Owing to their potential technologic applications, the fabrication of artificial opals has become a significant goal in the field of optics.

It is very advantageous to use artificial opals as a template from which to produce inverse opals of pure silicon. In this way the periodicity of the self-assembling opal template is transferred to the inverse opal. A large scale periodic microstructure is thereby produced efficiently and at low cost, without recourse to time consuming and expensive photolithograghy (see S. John and K. Busch, Journal of Lightwave Technology IEEE, volume 17, number 11, pages 1931-1943, (1999)). Up to this point in time, conventional photolithography has produced only very small scale structures, with a very small number of repeating unit cells (see S. Y. Lin and J. G. Fleming, J. of Lightwave Technology IEEE, 17, no. 11, 1944 (1999) and S. Noda et al. ibid, 1948 (1999)). This method is effective for creating two-dimensional patterns, but does not readily lend itself to the production of large scale three-dimensional periodic structures.

It is particularly advantageous to provide a method which can produce inverse silicon opals with lattice constants spanning the range from which useful photonic devices could be produced and which at the same time is scalable to a very large number of repeating unit cells. With such a silicon inverse opal, a large number of photonic devices can be integrated into a single three-dimensional optical chip.

SUMMARY OF THE INVENTION

It is an object of the present invention to provide a method for synthesizing periodic silicon composite materials having unique optical properties, one being a complete photonic bandgap.

The synthesis and characterization of high quality, very large scale, face centered cubic photonic band gap (PBG) material comprising a composite of pure silicon-air, exhibiting a complete three-dimensional PBG centered on a wavelength of 1.46 µm is disclosed.

The present invention provides a method of producing artificial silica opals with high optical quality, which can be made by microspheres in a wide range of diameters from 0.22 to 1.3 microns. A long-range face centered cubic (fcc) ordering of the spheres in air medium has been achieved. The porous lattice of these materials confers upon them the possibility to be employed as templates, in which different materials can be infiltrated. Hence, they inherit the fcc order of the template.

Infiltration of these templates by silicon followed by removal of the silica provides inverse silicon opals. This is obtained by chemical vapor deposition and anchoring of disilane into a self-assembling silica opal template, wetting of a thick silicon layer on the interior surfaces of the template, and subsequent removal of the template. This achievement realizes a long standing goal in photonic materials and opens a new door for complete control of radiative emission from atoms and molecules, light localization and the integration of micron scale photonic devices into a three-dimensional all-optical micro-chip.

More particularly, the present invention provides a method for the synthesis of a 0.1 mm to 1.0 cm scale single crystal of a face centered cubic (fcc) PBG material, comprising a close packed 0.870 micron diameter air spheres in pure silicon. This silicon PBG material has a complete three-dimensional PBG centered in the range of 1.3 to 1.7 microns, the wavelength range of choice for fiber optic telecommunication systems. The self-assembly synthetic approach that we employ is straightforward, mild, inexpensive, accurate, and yields single crystal, inverse opal structures made of silicon comprising up to 10,000×10,000×10,000 unit cells into which various defect network architectures can be imprinted during the initial stage of synthesis. The methodology is compatible with, and can be easily integrated into, existing silicon fabrication manufacturing facilities.

In one aspect of the invention there is provided a three dimensional periodic composite material comprising silicon and at least one other dielectric component having an effective dielectric constant smaller than a dielectric constant of silicon, the periodic composite material having a lattice periodicity ranging from about 0.28 microns to about 1.8 microns.

In another aspect of the invention there is provided an inverse silicon opal comprising close packed spherical air voids in silicon, the spherical air voids having a diameter in a range from about 0.2 to about 1.3 microns.

In another aspect of the invention there is provided a method of growing an inverse silicon opal, comprising:

providing a three dimensional opal template comprising particles having an effective geometry and composition;

infiltrating the opal template with an effective amount of silicon into voids between said particles; and etching out the particles to produce an inverse silicon opal.

The present invention also provides a method of growing an inverse silicon opal, comprising:

providing a three dimensional silica opal template made of silica spheres;

infiltrating voids in the silica opal template with enough silicon to fill between about 80% to about 100% of said voids; and etching the silica spheres out of the template to produce an inverse silicon opal.

The present invention also provides a method of growing an inverse silicon opal with a complete three dimensional photonic bandgap, comprising:

providing a three dimensional silica opal template including substantially mono-disperse silica spheres having a diameter in a range from about 0.55 to about 1.3 microns;

infiltrating voids in the silica opal template with enough silicon to fill between about 80% to about 100% of said voids; and etching all the silica out of the template to produce an inverse silicon opal.

In another aspect of the invention there is provided a method of growing silica spheres having a diameter between about 0.55 microns to about 1.3 microns, comprising:

growing silica seed particles by rapidly adding a first amount of tetraethylorthosilicate (TEOS) to a stirred alcohol solution comprising water and aqueous ammonia to form a suspension of silica seed particles;

after a first effective period of time of stirring enlarging the silica seed particles to silica spheres with a preselected diameter by slowly adding a second amount of tetraethylorthosilicate (TEOS) with stirring and thereafter stirring the suspension for a second effective period of time; and collecting the silica spheres with a diameter between about 0.6 microns to about 1.3 microns from said suspension.

The present invention provides method of synthesizing an opal from silica spheres, comprising;

providing a suspension of silica spheres in a liquid, the silica spheres having an effective diameter and the liquid having an effective viscosity and density so said silica spheres settle with an effective velocity;

settling the silica spheres from said suspension at a first effective temperature to form a sediment of preselected dimensions; and drying the sediment at a second effective temperature.

BRIEF DESCRIPTION OF THE DRAWINGS

The method of synthesis of silicon-based photonic band gap materials according to the present invention will now be described, by way of example only, reference being made to the accompanying drawings, in which:

FIG. 1 shows a transmission electron micrograph (TEM) image of silica spheres (left) and the corresponding size distribution (right);

FIG. 2 shows a scanning electron micrograph (SEM) image of silica spheres made by a re-growth process on seeds having a diameter of 0.853±0.012 microns (left) and the corresponding size distribution (right);

FIG. 9 shows scanning electron micrographs for a silica opal template sintered at 950° C. for 3 hours (left) and sintered at 1025° C. 12 hours (right);

FIG. 10(a) is a scanning electron micrograph (SEM) of an internal [113] facet of a Si infiltrated opal produced in accordance with the present invention;

FIG. 10(b) is an atomic force microscopy (AFM) image of a surface showing smooth growth of silicon on an opal template;

DETAILED DESCRIPTION OF THE INVENTION

Figure 3:
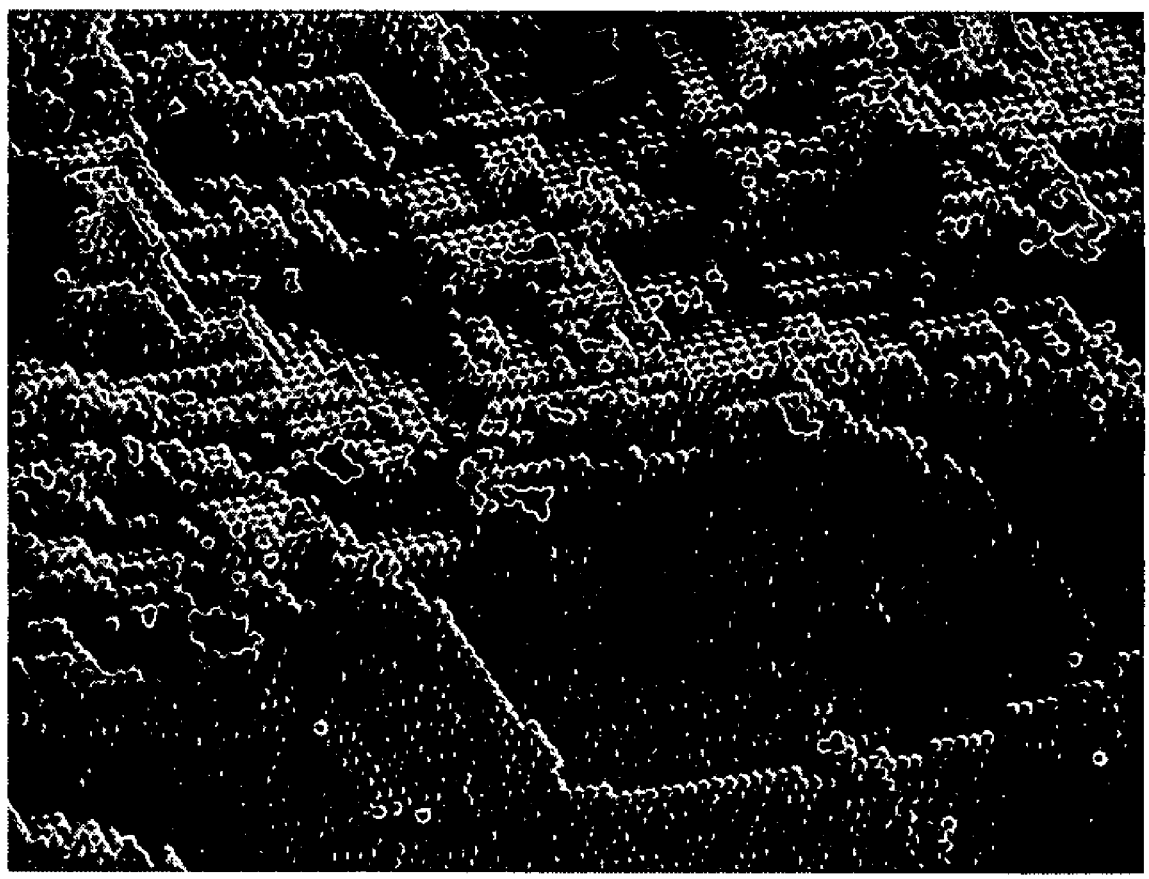
FIG. 3 shows an SEM image of a cleft edge of a crystallized sediment of 0.448 micron diameter silica spheres.

In a preferred embodiment of the present invention there is provided a three dimensional periodic composite material comprising silicon and a dielectric component having a dielectric constant smaller than the dielectric constant of silicon. The periodic composite material has a cubic lattice periodicity (center to center distance between adjacent cubic repeating units) ranging from about 0.28 microns to about 1.8 microns.

In a more preferred embodiment the dielectric constant of the lower dielectric component is in a range from about 1 to about 2.1 and said composite material is characterized by at least one complete photonic bandgap centered in the range of 1.3 to 1.7 microns. A preferred method of producing this silicon/dielectric material composite involves producing an inverse silicon opal from a silica opal with the silica opal produced using monodisperse silica spheres of selected diameter. A major advantage obtained by producing an inverse silicon opal in this way is that composites with complete photonic bandgaps can be economically synthesized which heretofore has not been realized.

The fabrication of artificial opals requires several stages including 1) synthesis of monodisperse silica spheres with diameter between 0.2 and 1.3 microns; 2) growth of silica opal template; and 3) sintering the three dimensional periodic structure to increase the mechanical stability and control the volume filling fraction. After synthesis of the artificial opal, silicon (silicon alloys) is infiltrated into the opal template followed by etching to remove the silica.

1) Growth of Silica Spheres

The method of synthesis begins with the highly controlled formation of a silica opal template comprising a weakly sintered face centered cubic (fcc) lattice of monodisperse silica ($SiO_2$) spheres having a diameter chosen between 0.6 microns and 1.3 microns. The inverse opal is produced by infiltration of the template with the desired amount of silicon then etching away the silica, described more fully hereinafter. The choice of large silica spheres with diameters in the range between 0.6 microns and 1.3 microns ensures that the final reverse opal structure will have a complete PBG in a frequency range below the optical absorption edge of bulk silicon which makes it a building block for silicon-based optical circuit elements.

1i) Growth of Spheres with Diameter between 0.2 to 0.6 Microns

In one aspect of this invention there is provided a method of synthesizing suspensions of silica colloidal spheres of diameters in the range 0.2-1.3 microns which are monodisperse with a narrow size distribution (standard deviation <5%) in such a way as to reduce formation of defects in the spheres, which advantageously reduces imperfections in opal structures produced from the silica spheres. The inventors have discovered that the synthesis of monodisperse (typically less than 5% variation in diameter) large silica spheres may be achieved by a modified Stöber method [W. Stöber, A. Fink, E. Bohn; J. of Colloid and Interface Science, Vol. 26, pp. 62-69, 1968].

Generally, smaller silica spheres (0.2-0.6 micron diameter) were grown by mixing two different solutions, one containing a mixture of water, ammonia and ethanol and the other containing a mixture of tetraethylorthosilicate (TEOS) and ethanol were mixed. The concentrations employed are shown in Table 1. Water was used as a varying parameter to control the sphere size. The solution was thoroughly agitated and the temperature kept constant by using a thermally stabilised bath at 27° C. This was done in order to prevent lack of homogeneity in the solution during particle growth. By this procedure suspensions of spherically shaped, well dispersed silica particles of diameters between 0.2 and 0.55 microns were obtained. The size distribution was very narrow, the standard deviation being between 2% and 5% in all cases. After this, the suspensions were centrifuged in alcohol several times, the supernatant liquid being removed each time. This was done in order to completely clean the suspensions from the ammonia remains of the synthesis process. Following collection and cleaning of the colloidal spheres they are dispersed in water. Example 1 gives an illustrative, non-limiting example of growth of silica spheres smaller than 0.6 microns in diameter.

EXAMPLE 1

Synthesis of 0.448±0.006 Micron Diameter Silica Spheres.

Two different solutions were prepared, the first solution contained 0.727 ml of tetraethylorthosilicate (TEOS) and 4.5 ml of ethanol. The second solution included 1.219 ml (28% weight in water) of $NH_3$, and 0.864 ml of double distilled water and 4.69 ml of ethanol. The solutions were kept at 27° C. in a thermally stabilised bath for 1 hour. The solutions were then mixed and stirred and the reaction allowed to proceed for two hours. When all the TEOS had reacted the colloidal spherical particles of the suspension were analysed by scanning electron microscopy (SEM) and an image of some spheres and their size distributions determined by light scattering may be seen in FIG. 1. The different concentrations employed for different batches of different sphere samples are shown in Table 1.

TABLE 1

| Concentrations of the different chemicals employed in the sphere synthesis process. | | | |
|---|---|---|---|
| TEOS (M) | [$NH_3$] (M) | [$H_2O$] (M) | φ (µm) ± σ (nm) |
| 0.266 | 1.45 | 4.6 | 0.361 ± 0.013 |
| 0.266 | 1.45 | 5.6 | 0.426 ± 0.014 |
| 0.266 | 1.45 | 7.6 | 0.448 ± 0.006 |
| 0.266 | 1.45 | 9.6 | 0.485 ± 0.009 |
| 0.266 | 1.45 | 11.6 | 0.555 ± 0.015 |
| 0.266 | 1.45 | 13.6 | 0.581 ± 0.013 |
| 0.266 | 1.45 | 15.6 | 0.502 ± 0.033 |
| 0.266 | 1.45 | 17.6 | 0.431 ± 0.024 |
| 0.266 | 1.45 | 19.6 | 0.332 ± 0.049 |
| 0.266 | 1.45 | 21.6 | 0.313 ± 0.031 |
| 0.266 | 1.45 | 23.6 | 0.0272 ± 0.022 |

1ii) Growth of Spheres with Diameter between 0.55 to 1.3 Microns

Suspensions of colloidal silica spheres with diameters in the range 0.55-1.3 microns were produced starting with suspensions of 0.55 micron diameter spheres grown according to Example 1 above. The 0.55 micron silica spheres were used as seeds on which a continuous silica growth process was carried out. Due to the larger sphere size of the seeds, a smaller number of re-growth cycles are needed advantageously providing a synthesis process much faster than has been available to date. Monodisperse spheres having a diameter of 1.3 microns were grown using three re-growth cycles. The particles were allowed to settle under natural sedimentation (1 g) In water which facilitated obtaining monodisperse particles. By doing this, it was possible to separate the smaller spheres, those remaining from the original seed suspension or resulting from a thinner silica recovering, from the larger ones. Once the smaller spheres were removed from the suspension the standard deviation was determined to be between 2 and 5%. Illustrative and non-limiting examples of growth of silica spheres between 0.6 to 1.3 micron diameter are given herebelow.

EXAMPLE 2

Synthesis of 0.863±0.025 Micron Diameter Silica Spheres

Silica seed particles were grown to diameters of about 0.55 microns by mixing 74 ml of absolute ethanol, 10 ml of aqueous ammonia (32% wt) and 4 ml of double distilled water and stirring the mixture in a flask with a magnetic stirrer. Then, 5 ml of tetraethylorthosilane (TEOS) was added rapidly with stirring to get the seeds in suspension. After 2 hours the first re-growth cycle was initiated by adding 10 ml of TEOS drop by drop over a period of 30 minutes while the suspension was stirred with a magnetic stirrer. For 3 hours after addition of this TEOS the stirring was maintained after which the colloidal silica is washed with ethanol three times and then with water three times again. The colloidal spherical particles of the suspension were analysed by scanning electron microscopy and an image of the same spheres and their size distribution determined by light scattering may be seen in FIG. 2. Table 2 summarizes the amounts of TEOS added along with the diameters of the spheres obtained and the standard deviation $\sigma$.

TABLE 2

TEOS concentration employed in the sphere re-growth process.
Seed concentration: 0.64% volume. Seeds: 0.55 microns diameter spheres. [TEOS] is given in volume percentage.

| $1^{st}$ [TEOS] % Vol. | 2nd [TEOS] % Vol. | Diameter (μm) | $\sigma$ (%) |
|---|---|---|---|
| 5.38 | No | 0.740 | 2.8 |
| 7.53 | No | 0.770 | 2.5 |
| 10.75 | No | 0.863 | 2.9 |
| 5.38 | 5.38 | 0.886 | 3.7 |

EXAMPLE 3

Synthesis of 1.090+0.021 Micron Diameter Silica Spheres

Silica seeds of diameter of 0.55 microns were grown as described above in Example 2. To a stirred suspension of these seed particles 5 ml of TEOS was added rapidly. After 2 hours of stirring the seed suspension, 74 ml of absolute ethanol, 10 ml of aqueous ammonia (32% wt) and 4 ml of double distilled water were added (0.32% volume of seeds) while the suspension was stirred. The first re-growth cycle was initiated by adding 10 ml of TEOS (5.52% volume) drop by drop, over a period of 90 minutes while the suspension was stirred. After all the TEOS was added the stirring was continued for another 2 hours. The second re-growth step was initiated by transferring 100 ml of this suspension to another flask and adding 10 ml of TEOS (10% volume) drop by drop, to the suspension over a period of 90 minutes with stirring. After stirring the suspension for 3 hours the colloidal suspension was washed as described above in Example 2.

EXAMPLE 4

Synthesis of 1.360+0.039 Micron Diameter Silica Spheres

Silica seeds of diameter of 0.55 microns were grown as described above in Example 2. After 2 hours of stirring the suspension of 0.55 micron diameter seeds a solution comprising 74 ml of absolute ethanol, 10 ml of aqueous ammonia (32% wt) and 4 ml of double distilled water was added (0.32% volume of seeds) while the suspension was continuously stirred. The first re-growth process was initiated by adding 10 ml of TEOS (5.52% of volume) drop by drop over a period of 70 minutes while the suspension was stirred. After this the stirring was maintained for 2 hours. The second re-growth process was initiated by transferring 98 ml of this suspension to another flask to which was added 15 ml of TEOS (15.31% volume) drop by drop over a period of 140 minutes while the suspension was stirred with a magnetic stirrer. The resulting mixture was stirred for 4 hours. The third regrowth step was initiated by adding 15 ml of TEOS (15.31% volume) drop by drop to the suspension over a period of about 150 minutes. The stirring was maintained for a further 4 hours and then the colloidal suspension is washed as in the above Example 2. Table 3 gives the TEOS concentrations used in the re-growth process.

TABLE 3

TEOS concentration employed in the sphere re-growth process.
Seed concentration: 0.32%. Seeds: 0.55 microns diameter spheres. [TEOS] is given in volume percentage.

| 1st [TEOS] % Vol. | $2^{nd}$ [TEOS] % Vol. | 3th [TEOS] % Vol. | Diameter (μm) | $\sigma$ (%) |
|---|---|---|---|---|
| 5.52 | No | No | 0.832 | 2.5 |
| 5.52 | 5.81 | No | 1.000 | 2.2 |
| 5.52 | 10 | No | 1.090 | 1.9 |
| 5.52 | 15.31 | 15.31 | 1.360 | 2.9 |

The method of silica sphere growth disclosed herein very advantageously provides monodisperse spheres with a dispersity less than 5%. These are the essential building-blocks needed to produce the silica opal templates from which the inverted silicon opals are produced.

2) Growth of Silica Opal Template

The next step in the fabrication of an artificial opal is the crystallization of the silica spheres into a three dimensional periodic structure or template. The inventors have discovered that different methods for settling silica spheres are needed depending on the sphere diameter.

2i) Crystallisation of Spheres of Diameters between 0.2 and 0.55 Microns in a Face Centred Cubic Structure In this range, natural sedimentation (under 1 gravity) in an aqueous solution was used to crystallize the opal. There was dispersed 175 mg of spheres in 180 cm$^3$ of water. The silica spheres were allowed to settle on a circular polished poly (methylacrylate) substrate (mean rugosity <50 nm) having a 2 cm diameter. The sediment was completely formed after several days, depending on sphere size (larger spheres sedimented faster than the smaller ones). Once the sediment was formed, the supernatant liquid was removed and the sedimentation tube placed in an oven at 60° C. until the water was fully evaporated. Afterwards, the sediment was carefully removed from the substrate and its structure was analyzed.

Studies of the growing surface confirmed that the spheres arrange in a close packed structure, which grows close to the equilibrium following the Edwards-Wilkinson equation. This implies the particles behave as effective hard spheres. This conclusion is supported by the fact that no ordering was observed in the suspension even at high concentrations. Also, the sedimentation velocity followed Stokeslaw. Three-dimensional order was analysed by SEM and optical transmission spectroscopy. Samples were fractured and the internal free surfaces observed. Cleft edges show long range face centred cubic domains, no facets belonging to any other type of periodic structure being observable. Domain size ranges from 20 to >100 microns.

EXAMPLE 5

Crystallization of 0.448±0.006 Micron Diameter Silica Spheres

Initially 175 mg of such -spheres were dispersed in 180 cm³ of double distilled water. Spheres were let to settle during 7 days on the mentioned above substrate. The supernatant liquid was then removed until a 2 mm high liquid column was left above the sediment. The sedimentation tube was then placed in an oven at 60° C. until the whole liquid evaporated (1 day). The sediment was then carefully removed from the substrate and its internal structure analyzed. An example of a fractured edge is shown in FIG. 3, in which a long range fcc domain can be observed.

2ii) Crystallisation of Spheres of Diameters between 0.55 and 1.3 Microns in a Face Centred Cubic Structure by Using Different Solvents, Co-solvents and Temperatures In order to obtain opals made of large spheres different organic solvents were employed as a sedimentation medium. This was done to change the falling velocity of the particles as well as the interactions between them. Ethyleneglycol, glycerol, acetone and ethanol and their aqueous mixtures at several different concentrations were used as settling media. Spheres were then allowed to settle. When the sediment was formed, the supernatant liquid was removed until a 2 mm height liquid column was left in the sedimentation tube. Then, the sediment was dried at different temperatures in an oven, ranging between 60° C. and 120° C. Temperature plays an important role in the crystallization process. Excellent results were obtained. SEM and optical characterization show that fcc optical quality opals were obtained by this procedure.

EXAMPLE 6

Crystallization of 0.853±0.012 Microns Diameter Silica Spheres.

Figure 4:
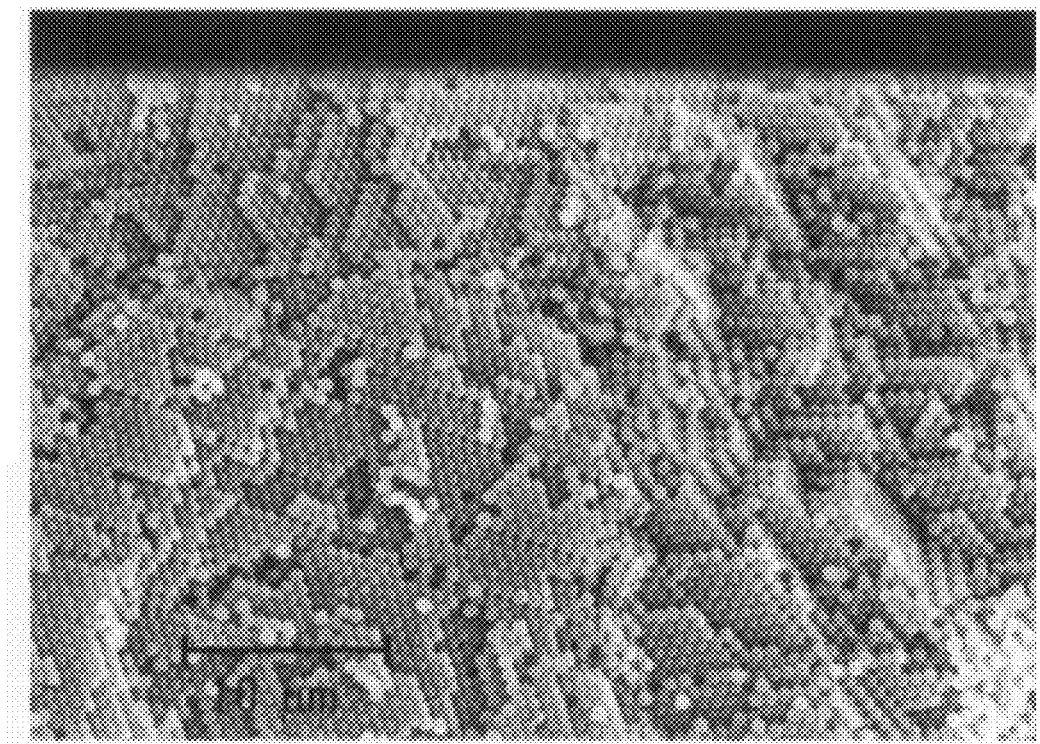
FIG. 4 shows an SEM image of a cleft edge of the crystallized sediment of 0.853 microns diameter silica spheres.

About 179 mg of spheres having a diameter of 0.853±0.012 microns were dispersed in 180 cm³ of a mixture of 40% weight of etyleneglycol and 60% of double distilled water. Spheres were allowed to settle during 4 days on the above mentioned substrate. Then the supernatant liquid was removed until a 2 mm height liquid column was left above the sediment. The sedimentation tube was then placed in an oven at 60° C. during 1 day and later at 100° C. during 5 days. When the sediment was dry, it was carefully removed from the substrate and its internal structure analyzed. An example of a fractured edge is shown in FIG. 4, in which a long range fcc domain can be observed.

2iii) Crystallisation of Spheres of Diameters between 0.55 and 0.9 Microns in a Face Centred Cubic Structure by Electrophoretic Deposition to Control Artificial Opal Growth Natural sedimentation presents two problems. The first one is the time required to obtain an opal. If the silica spheres are too small (under 0.30 microns of diameter), several weeks are needed or even they may not settle at all because thermal agitation compensates gravitational forces. The other difficulty that has been observed is related to heavy spheres which are over 0.56 microns in diameter. In this case the sedimentation velocity is such that it is difficult to achieve an ordered array and it becomes completely impossible if the diameter is further increased. In this situation, the electrophoretic phenomena offers a method for overcoming these two problems. Using the electric field to drive the sedimentation velocity and keep it around 0.4 mm/hour would solve the difficulties mentioned before. The model of constant velocity particle packing is based on the interaction of gravitational ($F_g=1/6\pi\rho_s gd^3$), Archimedes ($F_A=1/6\pi\rho_w gd^3$) and frictional forces ($F_f=3\pi\eta vd$). Where $\rho_s$ and $\rho_w$ are the spheres and water mass densities, g is the gravity acceleration, $\eta$ is the viscosity of water, d is the spheres diameter and v is their velocity. When all forces are balanced, the Stokes law is obtained.

It is well known that $SiO_2$ particles in a colloidal suspension have a surface charge density when they are away from the point of zero charge (PZC), in which case the electric charge is null. Taking into consideration the force produced by an electric field E parallel to all other forces, the following equation is obtained for the velocity:

$$v=[(d^2(\rho_s-\rho_w)g)/18\eta]+uE$$

where the first part of this equation is the classical Stokes law and the second part corresponds to the contribution of the electric field to the sedimentation velocity, related to the mobility of the spheres u. Now, the main problem is how to calculate the particle's mobility. The application of the electrophoretic concept can solve it. Provided that Stokes velocity without electric field is calculated with great accuracy, the electrophoretic mobility can be obtained in a straightforward manner if Stokes velocity is subtracted from the experimental velocity of the sample under a known electric field. Once the mobility is determined, the electric field necessary to achieve a given velocity can be stated beforehand.

Figure 5:
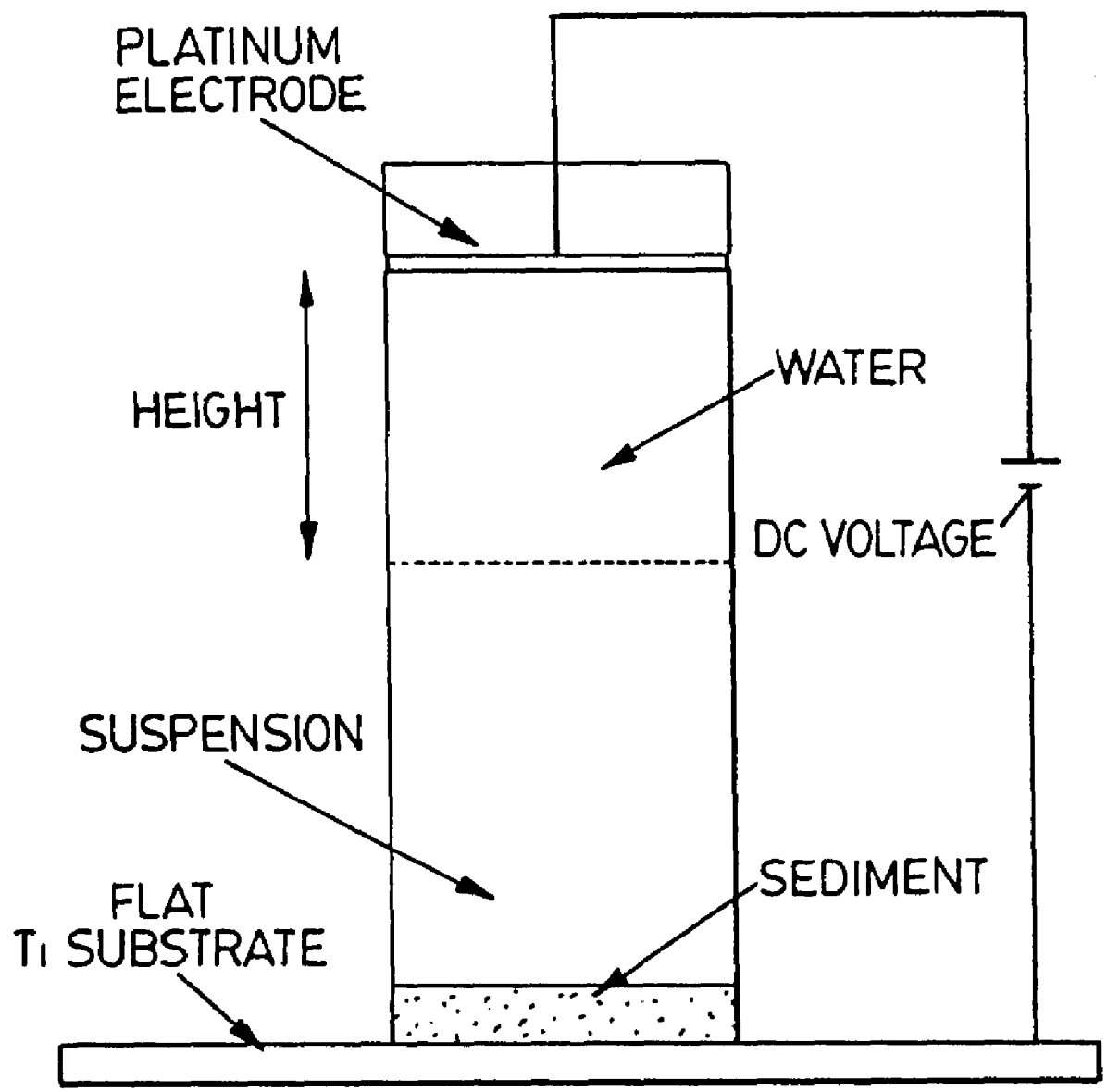
FIG. 5 is a vertical view of an electrophoretic cell used to grow silica opals.

The electrophoresis cell shown in FIG. 5 comprised a cylindrical tube (2 cm of diameter) of poly(methylacrylate) fixed to the base where the opal should settle, obtained from a standard silicon wafer sputtered with titanium or gold (with less than 0.1 nm of rugosity and thick enough to assure a good conductivity). The material used for the upper electrodes were platinum because it has the highest redox potential so that electrolysis is avoided. Both electrodes are connected to a dc source in order to develop an electrical field. With this method sediments with thickness ranging between a few monolayers and 1 mm (depending on the amount of silica spheres used) with surface areas about 3.1 cm² are produced. To measure the sedimentation velocity, the height descended by the colloid/clear water interface (setting 0 mm the initial height) was monitored with time.

Figure 6:
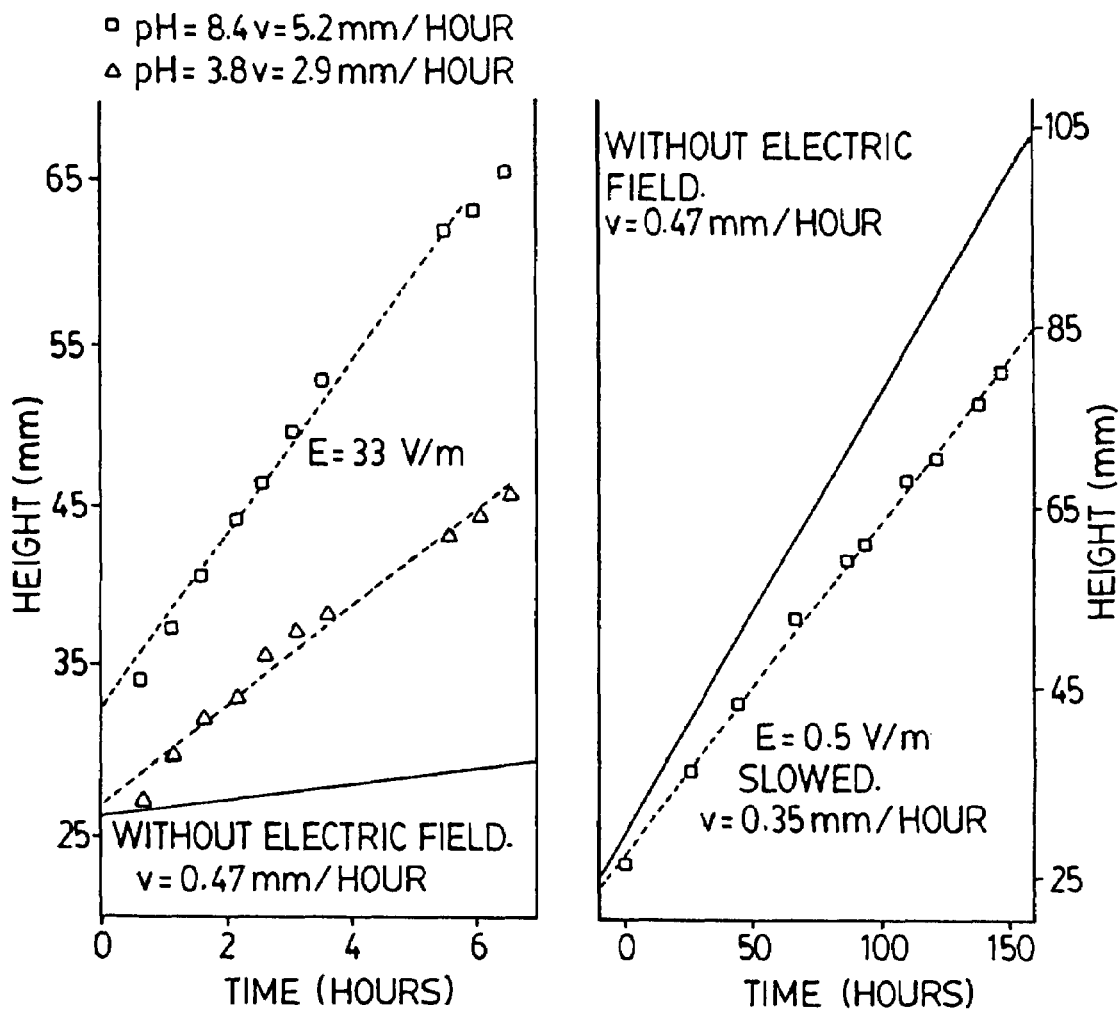
FIG. 6 are plots of settling times versus height for sedimentation of $SiO_2$ spheres of 0.500 micron diameter settling in the presence and absence of an electric field.

The electrophoretically assisted sedimentation of $SiO_2$ spheres was studied. An electric field was applied to colloidal suspensions of $SiO_2$ spheres in which the original pH was varied by adding HCl to change the surface charge. The point of zero charge, PZC, of silica occurs at a pH=2.5, so the pH values of the suspensions were chosen to be different enough without being close to the PZC: pH=3.8 and the reference value (no acid added) of pH=8.4. The results of the sedimentation velocities for silica spheres of 0.50 microns of diameter are graphically compared with the theoretical Stokes fall of a sample without electric field in the left panel of FIG. 6. It can be clearly seen that, as the pH moves away from the PZC, the mobility increases and so does uE.

TABLE 4

Mobilities and velocities from $SiO_2$ spheres of 0.50 microns in diameter at different pH and electric fields.

| PH | E (V/m) | u (μm cm/V s) | v (mm/h) |
|---|---|---|---|
| 3.8 | −33 | −2.0 | 2.9 |
| 8.4 | −33 | −3.9 | 5.2 |
| 8.4 | 0.5 | −3.9 | 0.35 |

In order to study the effects of velocity variations on silica particle ordering, two more sedimentations were prepared from the same sample. One of the suspensions was left to settle in the absence of an electric field, whereas in the other one the electrodes were inverted to decrease the sedimentation velocity by opposing the gravity and the electric field. Since the mobility can be extracted from the previous experiment (u=−3.9 μm cm/V), the electric field needed to get the desired velocity (0.4 mm/hour) was calculated to be 0.5 V/m. The experimental value (v=0.35 mm/hour, see right graph in FIG. 6) was close to it. In Table 4 the results from this experiments are numerically compared.

Electronic and optical microscopy studies of all these samples were made and it was observed that the sample in which sedimentation was slowed electrophoretically demonstrated superior ordering than the one settled in the absence of an electric field and while the accelerated samples from the previous experiment presented no order at all. Bragg diffraction was performed as well showing that the opal grown with controlled sedimentation presented well-defined Bragg peaks.

Figure 7:
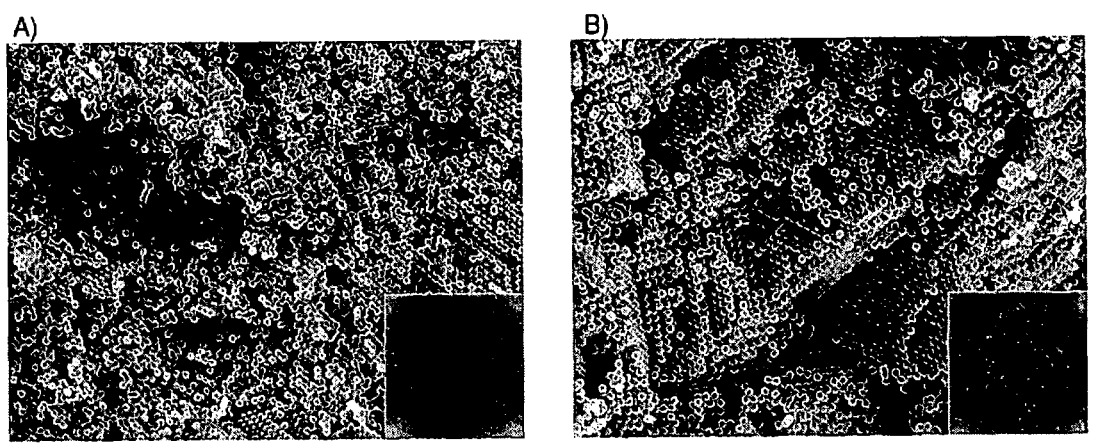
FIG. 7 shows SEM images of a cleaved edge of a silica opal produced using 0.870 micron diameter $SiO_2$ spheres according to the present invention, a) the spheres settled without an electric field, its Fourier transform (inset) showing the absence of order while the opal shown in b) was settled using an electric field, its Fourier transform (inset) showing the presence of periodicity.

For comparison, silica spheres with a diameter of 0.87 microns were settled both in the presence and absence of an electric field. The scanning electron microscopy (SEM) of a cleaved edge of the naturally settled opal (no E field) is shown in FIG. 7A. A high velocity (1.54 mm/hour) was obtained for these large spheres and no long-range order was achieved as evidence by the Fourier transformed image shown in the inset of FIG. 7A. A colloidal suspension of silica spheres of the same diameter was settled under a retarding electric field, in which the velocity was kept close to 0.35 mm/hour. FIG. 7B shows that large ordered domains are obtained when sedimentation is performed under an appropriate electric field. Confirmation of this is evident from the Fourier transforms of both images, the opal settled under electric field presents a clear pattern that is not present in the naturally settled opal.

Figure 8A:
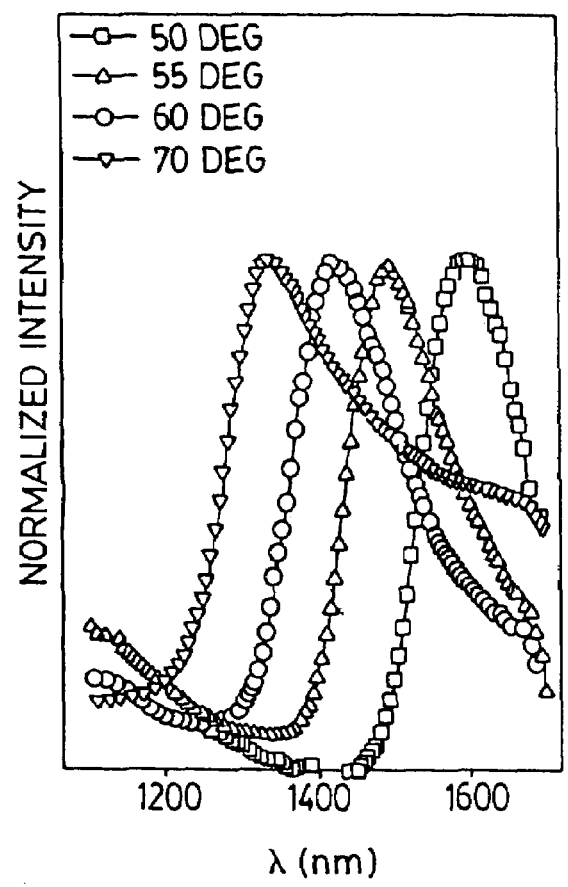
FIG. 8 shows Bragg diffraction from two different silica opals at different temperatures, (a) silica opal produced by sintering 0.870 micron diameter $SiO_2$ spheres according to the present invention whose sedimentation was slowed and (b) silica opal produced from as grown 0.205 micron diameter $SiO_2$ spheres settled under acceleration.

A Bragg diffraction study from the opal grown under slowed sedimentation conditions was performed after sintering and very clear peaks were measured as shown in FIG. 8a while the other sample did not present any kind of peak as a result of the lack of large enough ordered domains. In addition, a little percentage of small spheres was present in this sample. They were observed in SEM images of the naturally settled sample but they were not present in the other one because the electric force compensated the gravity force. This suggests that the electrophoretic concept could be used to control the presence of small spheres in sedimentation when monodispersity is not granted.

Figure 8B:
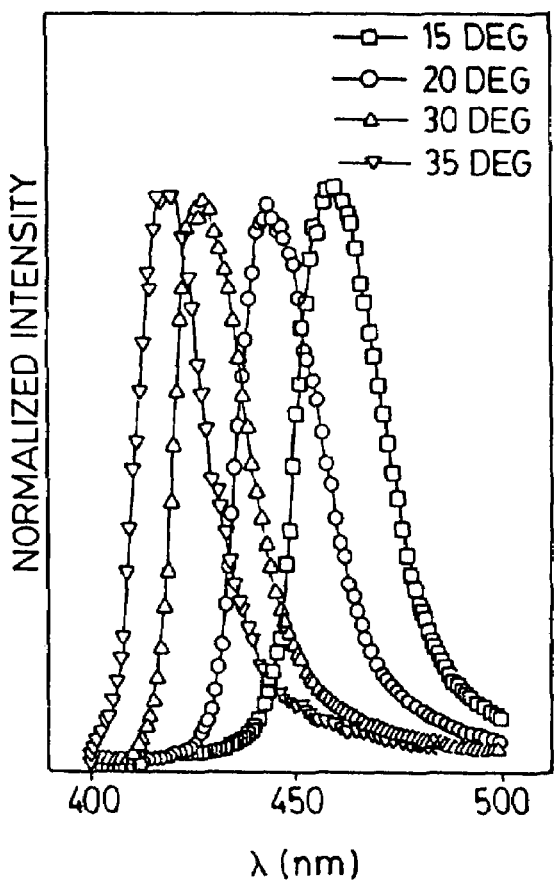

Normally a suspension containing silica spheres of small diameter, (e.g. 0.205 microns of diameter) would take up to two months to settle to produce the sediment. The settling rate using electrophoretic assisted sedimentation was accelerated from 0.09 mm/hour (natural velocity) to 0.35 mm/hour so that complete sedimentation was achieved in less than two weeks without decreasing the optical quality. Diffraction studies of the as-grown opal showed Bragg peaks as shown in FIG. 8b, which denoted the presence of order within the opal.

The results disclosed herein demonstrate the importance of using electrophoretic deposition for opal sedimentation. With this method it is possible to assemble opals comprising ordered arrays of spheres with diameters greater than 0.55 microns which has heretofore been a major limitation. Electrophoretic assisted deposition has been shown to be an efficient way to control the sedimentation velocity of silica spheres over a wide range of diameters.

EXAMPLE 7

300 mg of $SiO_2$ spheres with a diameter of 0.87 microns were suspended in 30 ml of double distilled water. An electric field value of E=−8.3 V/m was applied across a column of 8 cms in height containing the suspension. The sedimentation velocity was 0.35 mm/hour, and the mobility of these spheres was 4.0 mm cm/Vs. Six days were needed to perform the whole sedimentation and two more days to dry the samples at 60° C. in an oven.

3) Sintering the Three dimensional Periodic Silica Opal

Crystalline sediments of silica spheres suffer from low mechanical stability which makes them difficult to handle. In order to solve this, as-grown samples were sintered at different final temperatures. The sintering process leads to the necking, or the formation of small necks, between neighboring silica spheres. Necking is the thermally induced softening and flow of silica into the regions defined by the touching of silica spheres in the colloidal silica crystal to create a silica neck with a diameter that facilitates infiltration of silicon into the voids of the silica opal and etching of silica from the infiltrated opal to create the inverse silicon opal.

Another extremely important parameter of the opals when used as matrices for other compounds, is the filling fraction (ratio between the volume occupied for each compound and the total volume of the structure). Sintering provides an accurate way to control the filling fraction between 74% and 100% of silica in opals. The process of necking allows tuning of the dimensions of the silica opal and the resulting inverse silicon opal. The process of necking also provides mechanical stability to the template in addition to providing a control over the opal void volume for subsequent synthesis and providing the connected network topology for removal of the template by an etching process. Studies have shown that silica opals sintered at 950° C. for 3 hours have a mechanically stabilized compact face centered cubic (fcc) structure with a silica filling factor of 74%. Further, sintering the opals at different temperatures between 950° C. and 1100° C. for different periods of time provided a method of controlling or tuning the optical properties and the free volume in the opals. FIG. 9a shows an SEM of a silica opal sintered at 950° C. for 3 hours compared to a silica opal sintered at 1025° C. for 12 hours, FIG. 9b.

Example 8 below provides an illustrative, non-limiting example of use of sintering temperature for tuning the optical and physical properties of a silica opal.

EXAMPLE 8

Pieces of an opal synthesized from 0.426 micron diameter spheres were sintered at 1025° C. for different periods of time. One piece of the opal was placed in an oven and heated up to 70° C. employing a temperature gradient of 1°/min. Once the temperature reached 70° C. it was kept constant at 70° C. for 3 hours to prevent rapid or abrupt water desorption from the opal. After this, the temperature was increased up to 1025° C. employing a temperature gradient of 1°/min. The opal was maintained at this temperature for 3 hours. Two other pieces of the starting opal were sintered using the same procedure but one piece was sintered for 6 hours and the other for 12 hours. Characterization of the optical properties of the differently sintered opals reveal the free volume of the three opal pieces were different, decreasing with increasing temperature.

4) Infiltration of Silicon Into the Silica Opal

Silicon was grown inside the void spaces of the silica opal template by means of chemical vapor deposition (CVD) using disilane ($Si_2H_6$) gas as a precursor. The temperature during infiltration may be in the range from 100° C. to about 500° C., but preferably the temperature is varied from 250° C. for low in-filling samples to 350° C. for high in-filling ones.

Example 9 below provides illustrative, non-limiting examples of use of silicon infiltration into the silica opal template and annealing of the silicon in the template.

EXAMPLE 9

The silica opal was placed in a quartz cell and dried under vacuum for about 5 hours. Disilane gas was added to the cell to raise the pressure to about 200 torr, but the pressure may be in the range from 0.1 to about 760 Torr. The cell was heated at 350° C. for different periods of time hours, Table 5. The cell was evacuated by vacuum to remove disilane that remained unreacted and annealed to 500° C. for 30 minutes. (Disilane deposition: Dag O; Ozin G A; Yang H; Reber C; Bussiere G; Photoluminescent silicon clusters in oriented hexagonal mesoporous silica film, Advanced Materials 1999, Vol 11, Iss 6, pp 474-482. Chomski E; Dag O; Kuperman A; Coombs N; Ozin G A; New forms of luminescent silicon: Silicon-silica composite mesostructures, Advanced Materials: Chemical Vapor Deposition 1996, Vol 2, Iss 1, pp 8-15. Silicon annealing: Temple-Boyer P; Scheid E; Faugere G; Rousset B; Residual stress in silicon films deposited by CVD from disilane, Thin Solid Films 1997, Vol 310, Iss 1-2, pp 234-237).

TABLE 5

Conditions required for different degrees of silicon infiltration in the silica opal.

| Temperature (° C.) | Time (hours) | Degree of filling (%) |
|---|---|---|
| 350 | 12 | 88 |
| 350 | 24 | 100 |
| 335 | 44 | 100 |
| 335 | 24 | 50 |
| 335 + 350* | 36 + 24 | 65 |
| 335 + 335** | 24 + 24 | 80 |
| 335 | 48 | 90 |
| 350 | 48 | 90 |

*This sample was heated twice.
**After the initial heating, the cell was pumped out and fresh disilane added and the cell was heated again.

Theory predicts that the maximum PBG is obtained with a 90% to 97% in-filling of the opal voids in the form of a uniform, thick, wetting layer on the silica surfaces. The reaction time was typically 24 hours and the disilane pressure was about 200 torr. After anchoring and growth of silicon, the samples are annealed or heated to 500° C. to assist diffusion of silicon into the voids in the template to provide substantially uniform spatial distribution of silicon in the voids. The annealing temperature is varied depending on whether crystallization of the silicon is required. The silica-silicon composite may be annealed in the temperature range from about 400° C. to 950° C.

The silica template is subsequently removed using fluoride-based etching procedures designed to minimize the dissolution of the macroporous silicon framework. The inverse silicon opal may be annealed in the temperature range from about 400° C. to 1100° C.

Examples below provide illustrative, non-limiting examples of silica opal removal from the composite silicon-silica opal material.

EXAMPLE 10

From the silicon photolithography literature, fluoride based etches have the best selectivity for silica in the presence of silicon. In this example, the silicon infiltrated silica opal template was placed in a 1 or 2% aqueous HF solution for about 8 hours. To those skilled in the art of etching silica from silicon it is well known that buffered 10:1 $NH_4F/HF$ solution can be usefully employed to keep a constant level of fluoride ions. This is common in small photolithography setups to dissolve silica in the presence of silicon. (Silicon Etchants: Ghandhi, SK; VLSI Fabrication Principles, Wiley, 1983). Thermal reductive-elimination of surface hydride from the inverse silicon opal is employed to control the ultimate hydrogen content of the silicon layer.

In addition to disilane, other precursors for silicon that could easily be infiltrated into silica colloidal crystals (opals) followed by sacrificial etching of the silica template include the following. Molecular beam and laser ablation of Si atoms followed by thermal post treatment in a controlled atmosphere to control the amorphous and crystalline silicon content. Capped and uncapped colloidal and molecular cluster forms of silicon using vapor, melt and solution-phase techniques followed by thermal post treatment. Infiltration of silane-based polymers using solution and melt impregnation and thermal post-treatment techniques. Other volatile CVD silane-based precursors may be taken from the homologous series $Si_nH_{2n+2}$ where n=1, 2, 3 etc.

Examples of other silicon precursors, other deposition techniques, other forms of silicon for synthesizing the inverse silicon opal comprise, but are not limited by, the following. Capped silicon clusters like octasilacubanes ($R_8Si_8$) could be used as a Si source for CVD. Octa-tert-butyloctasilacubane vaporizes around 200° C. and decomposes to silicon from 350-450° C. Furukawa K; Fujino M; Matsumoto N; Superlattice structure of octa-tert butylpentacyclo-[4.2.0.0(2,5).0(3,8).0(4,7)]octasilane found by reinvestigation of X-ray structure analysis, Journal Of Organometallic Chemistry 1996, Vol 515, lss 1-2, pp 37-41. Yang C S; Bley R A; Kauzlarich S M; Lee H W H; Delgado G R; Synthesis of alkyl-terminated silicon nanoclusters by a solution route, Journal Of The American Chemical Society 1999, Vol 121, pp 5191-5195. Silicon nanocrystallites could be used to infiltrate the silica opal. Sweryda-Krawiec B; Cassagnneau T; Fendler J H; Ultrathin electroactive junctions assembled from silicon nanocrystallites and polypyrrole, Advanced Materials 1999, Vol 11, pp 644-659. Kanemitsu Y; Silicon and germanium nanoparticles, Light Emission in Silicon From Physics to Devices, Semiconductors and Semimetals, Academic Press, San Diego 1998, pp 157-202. Brus L; Silicon polymers and nanocrystals, Light Emission in Silicon From Physics to Devices, Semiconductors and Semimetals, Academic Press, San Diego 1998, pp 303-326. Abelson J R; Plasma deposition of hydrogenated amorphous silicon, studies of the growth surface, Applied Physics A, Materials Science & Processing 1993 Vol 56, pp 493-512. Yoon J H; Lim S H; Moon B Y; Jang J; Polycrystalline silicon film deposited at 300° C., Journal Of The Korean Physical Society 1999 Vol 35 S1017-S1020, Suppl. S. Bhat K N; Ramesh M C; Rao P R S; Ganesh B; Polysilicon technology, IETE Journal Of Research 1997 Vol 43, pp 143-154. Porous silicon could also be used, Cullis, A G; Canham L T; Calcoft P D J; The structural and luminescence properties of porous silicon, Journal Of Applied Physics 1997 Vol 82, pp 909-965.

Characterization of Inverse Silicon Opal

Micro-Raman spectroscopy (MRS) was used to ascertain the nature and quality of the sample. The silicon phonon peak observed in the inverse silicon opal samples was narrow and centered at 515 cm$^{-1}$, suggesting the presence of crystalline silicon. Scanning electron microscopy (SEM) and atomic force microscopy (AFM) were used to characterize the silicon growth. FIG. 10(a) shows an internal [113] face of the silicon, infiltrated opal. The SEM picture reveals a large single domain of fcc order and a thick, uniform layer of silicon surrounding the silica spheres, indicating a high degree of infiltration. Furthermore, the small necks between neighboring silica spheres, which appear white in the image, clearly demonstrate the connectivity of the lattice. In FIG. 10(b) an AFM image of a local area of the infiltrated opal surface is shown, highlighting the smoothness of the silicon coating. From the AFM measurements, the surface roughness was estimated to be 2 nm. The growth of the silicon-wetting layer is quite homogeneous and is independent of the local characteristics of the opal template. The nearly complete and homogeneous infiltration of silicon occurs throughout the depth of the sample.

Figure 11:
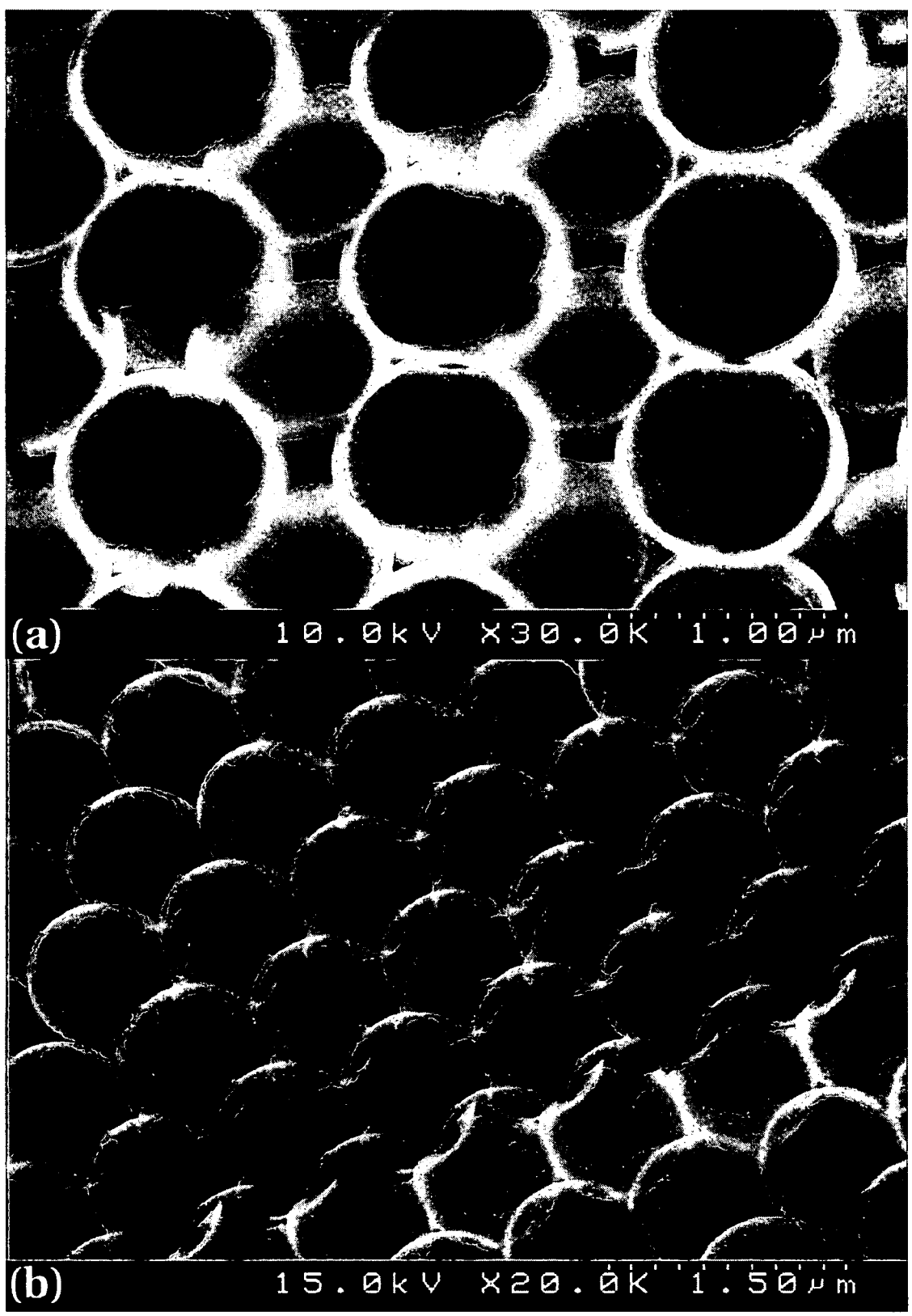
FIG. 11a shows an SEM image of an internal [110] facet of a silicon inverse opal.
FIG. 11b shows an SEM image of an internal [111] facet of a silicon inverse opal.

FIG. 11a is an SEM image of an internal [110] face of the inverse silicon opal taken after etching and FIG. 11b shows an internal [111] facet of an inverse opal structure. These images clearly show an infiltrated structure having an interconnected network of air spheres surrounded by thin silicon shells, inheriting the face centered cubic structure of the opal template. The adjacent air spheres are connected via windows, defining the neck regions which result from the sintering process.

Unlike earlier studies of inverse opal structures made of $TiO_2$ [see B. T. Holland, C. F. Blanford and A. Stein, Science 281, 538 (1998): J. Wijnhoven and W. L. Vos, Science 281, 802 (1998)], graphitic carbon [see A. A. Zakhidov et. al. Science 282, 897 (1998)], CdSe [see D. Norris, et. al. Adv. Mater. 11, 165 (1999)], and CdSe and CdS [see P. V. Braun and P. Wiltsius, Nature 402, 603 (1999)], the silicon inverse opal synthesized according to the present invention simultaneously satisfies the two essential criteria for complete PBG formation. First, the refractive index of silicon is 3.5, well above the theoretically determined threshold of 2.8 for a PBG in a fcc lattice of air spheres disclosed in K. Busch and S. John, Phys. Rev. E 58, 3896 (1998). Secondly, the optical absorption edge of the silicon backbone occurs at a frequency well above the frequency range of the PBG, thereby allowing coherent localization of light within the material, with minimal absorptive losses. This is an essential feature for future PBG device applications.

Figure 12:
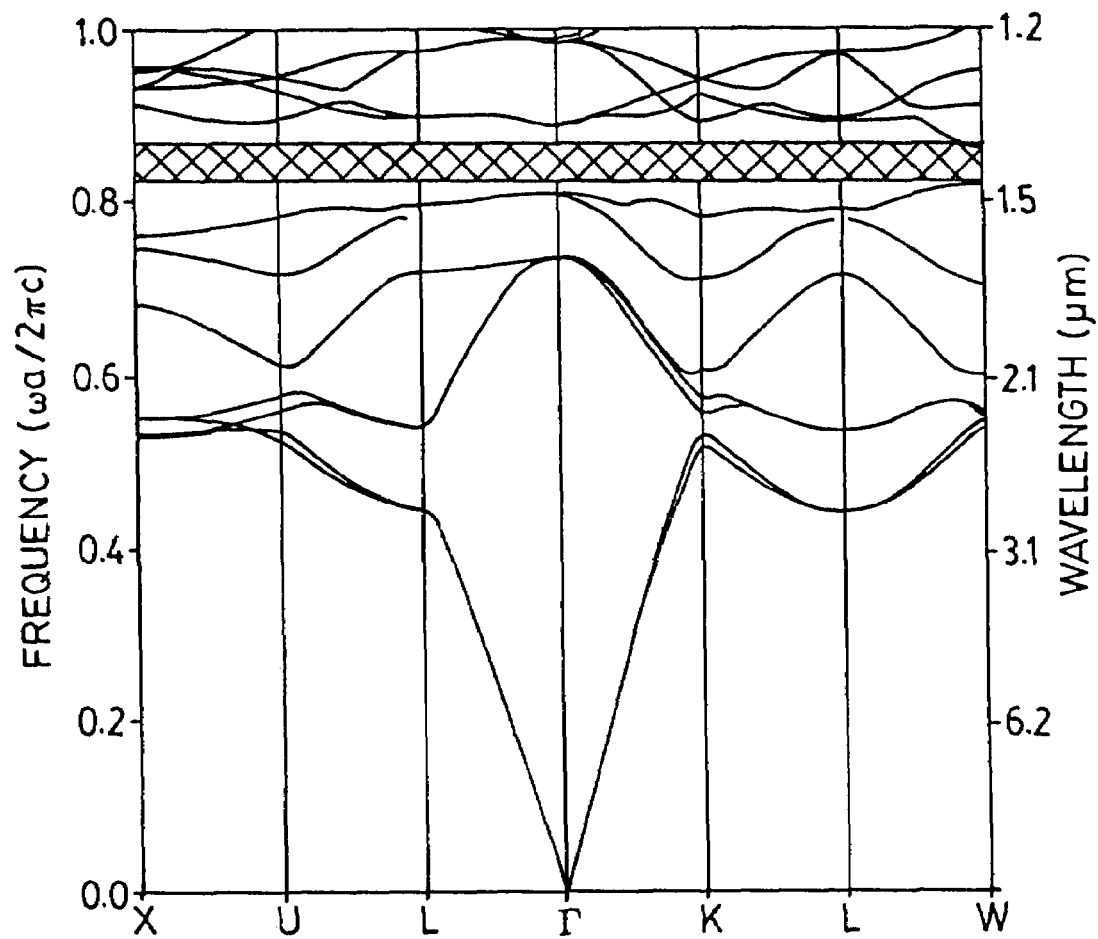
FIG. 12 shows the photonic band structure of a silicon inverse opal, with 88% infiltration of silicon into the opal template voids, the complete bandgap being shown by the crosshatched region.

The photonic band structure of a silicon inverse opal, with 88% infiltration of silicon into the opal template voids, is shown in FIG. 12. The hatched region highlights a complete PBG with a gap to mid-gap ratio of 5.1%. The calculations were performed using the plane wave expansion method, following the model of K. M. Ho, C. T. Chan and C. M. Soukoulis, Phys. Rev. Lett. 65, 3152 (1990), using a basis of 2662 plane waves.

The optical properties of the inverse opal were characterized by measuring the reflection spectrum and comparing the spectral positions of the observed stop bands with predictions from band structure. A Bohmen Fourier transform infrared (FTIR) spectrometer was used to measure the specular reflectance spectrum. In order to accurately fit the observed reflection spectrum of the inverse opal to the results from band structure calculations it was necessary to independently determine the lattice constant and the degree of silicon infiltration. The lattice constant is related to the sphere size of the original silica opal template. It was obtained by fitting the spectral positions of the first stop band edges in the Γ-L direction of the bare opal to the positions predicted by band structure calculations (the band edges were obtained by measuring the 3 dB points of the reflectance peak). The refractive index of the silica spheres was measured to be 1.456 using index matching experiments.

The degree of silicon infiltration is determined by both direct and indirect means. In the direct method, the SEM image is analysed by a computer graphics program. The graphics program provides a means of identifying image pixels in a 2 d coordinate system. The resolution of the SEM picture (measured in nanometeres/pixel) is obtained by measuring the pixel extension of the ruler drawn at the bottom of the SEM picture. The thickness of the silicon coating layer on the silica sphere is measured at a large number of points at locations on the picture where the thickness is clearly visible and the angle of viewing is known. The average value and the standard deviation is recorded. The (cubic) lattice constant can also be obtained from the center to center distance between adjacent spheres and multiplying by 1.4142. Using a formula which gives the degree of infiltration as a function of coating thickness, the degree of infiltration is evaluated. This formula is based on a model of the structure in which the silica spheres are in a close packed fcc (or other as the case may be) lattice and the silicon uniformly coats all exposed silica surfaces in the form of a spherical shell.

In the indirect method, the photonic band structure associated with the mathematical model described above is computed. This determines the precise frequency ranges spanned by all of the photonic stop bands (in specific directions) as well as the complete photonic band gap (spanning all directions). The optical reflectivity from the sample (at normal incidence to the sample) probing the lowest frequency stop gap is then fitted to the photonic band structure calculated for different silicon coating layer thicknesses. The best fit yields the actual coating thickness, and hence the degree of infiltration. It has been found that both the direct and the indirect methods yield the same result for the degree of silicon infiltration.

In characterizing the present inverse opals, after the infiltration of silicon, the reflectance spectrum in the Γ-L direction was again measured. The spectrum changed dramatically from that of the bare opal, with the first stop band shifting by 0.97 μm. With the sphere size fixed from the bare opal measurements, the degree of infiltration was determined to be 88% by fitting the positions of the first stop band edges to the calculated band structure.

In order to calculate the band structure of the silicon inverse opal and compare the measured spectrum, it was necessary to examine the lattice constant. The lattice constant, which is preserved after infiltration and inversion, was independently determined from reflectivity measurements of the bare silica opal at normal incidence (the L-point). A (cubic) lattice constant of 1.23 microns was obtained by fitting the spectral positions of the first stop band edges to those predicted by band structure calculations (using 1.45 as a refractive index for silica). This corresponds to center-to-center distance between adjacent spheres of 0.87 microns. (The cubic lattice constant is 1.4142×(the center to center distance) for the fcc lattice.)

Figure 13:
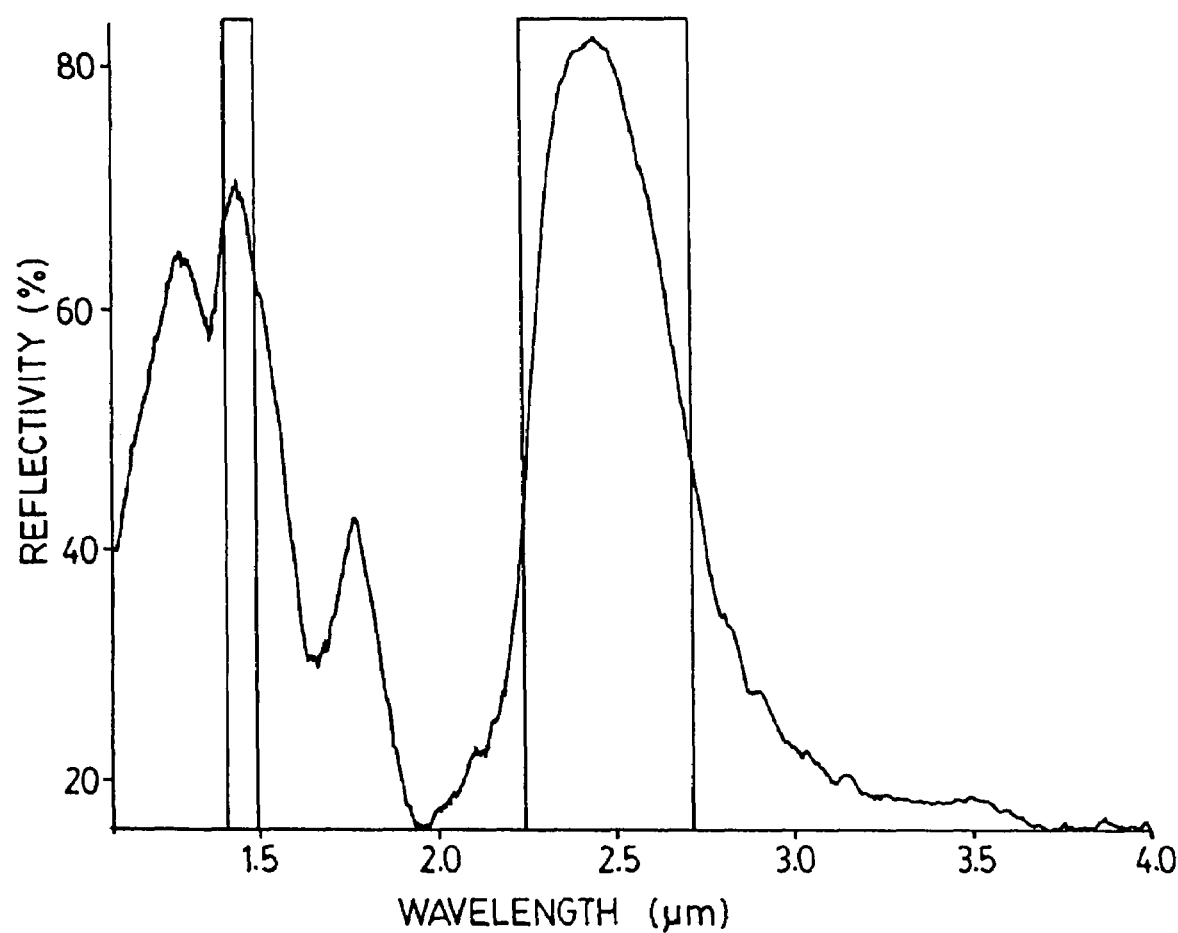
FIG. 13 shows the measured reflectivity spectrum of silicon inverse opal, the shaded regions centered around 2.5 µm and 1.46 µm show the calculated positions of the first stop band and the complete photonic bandgap.

The silicon inverse opal crystals obtained after etching were then measured. A microscope coupled to the FTIR was used to probe a single crystal domain and also cover a wide range of angles in a single measurement. The microscope produced a spot size of approximately 20×20 μm² and an incident cone of wave vectors with an angular bandwidth spanning 15-35° from normal incidence. The measured spectrum, shown in FIG. 13, exhibits a broad peak with a center wavelength of 2.5 μm followed by a series of three peaks in the near-IR regime. One of these latter peaks is centered at 1.46 microns with a width of 5.1% and corresponds to 88% silicon infiltration. Calculations show that this gap is sensitive to percent silicon, for example with 90% silicon infiltration the gap center moves to 1.5 microns.

The band structure also reveals something very surprising and unexpected. Namely, that as the degree of silicon infiltration is increased gradually from 88% to about 97%, somewhere in between, there will be observed a full PBG as large as 9% rather than 5%. The exact position of the optimum depends somewhat on the details of the sintering. Nevertheless an optimum of roughly 9% does appear in almost all of the models that were studied. At 100% infiltration the gap again reduces to about 5%.

These inverse silicon opals exhibiting a photonic bandgap may also be referred to as a silicon inverted colloidal photonic crystal (iCPC) since the photonic crystal is formed by inverting the colloidal silica crystal after it has been infiltrated with silicon as disclosed above.

TABLE 6

PBG Position And Relative Width For A Photonic Crystal Made From Spheres of Diameter 0.870 Microns And Index of Refraction 3.45

| Degree of Si infiltration (%) | PBG Center (microns) | PBG Width to Center Frequency Ratio (%) |
|---|---|---|
| 79 | 1.414 | 0.5 |
| 83 | 1.434 | 2.4 |
| 84 | 1.441 | 3.0 |
| 86 | 1.447 | 3.8 |
| 88 | 1.461 | 5.1 |
| 90 | 1.470 | 6.0 |
| 92 | 1.477 | 6.7 |
| 93 | 1.484 | 7.5 |
| 95 | 1.491 | 8.2 |
| 97 | 1.497 | 8.9 |
| 100 | 1.546 | 4.5 |

The synthesis of a very large scale, silicon based PBG material offers a number of imminent possibilities, involving further infiltration of this highly open structure with light sensitive (i.e. light emitting) molecules or atoms, magnetically sensitive dopants and electrically sensitive dopants. Preferred dopants for these silicon dopants photonic crystals are those that luminescence in a wavelength range located in or near the photonic bandgap. These luminescent dopants include, but are not restricted to, rare earth atoms such as erbium, organic dyes, inorganic dyes, organic polymers and inorganic polymers which luminesce.

Variations of the present invention comprise the inverse silicon opals having optically sensitive molecules adsorbed or chemically bonded to the surface of the silicon. Exemplary optically sensitive molecules include luminescent dyes and luminescent polymers adsorbed or chemically anchored to the surface in the form of monolayers or multilayers. The silicon surface may also be modified physically or chemically anchored/adsorbed monolayers or multilayers including hydrophobic and hydrophylic organic molecules that could facilitate the infiltration of other optically, electrically, magnetically interesting species.

The infiltrated silicon may be in the form of single crystal silicon, amorphous silicon, polycrystalline silicon, porous silicon and nanocrystalline silicon. Literature examples cited above for different precursors and different deposition techniques could be used to create these different forms of silicon which comprise the inverse silicon opal.

Further, alloys of silicon may be used to produce composite silicon-based materials with different optical/electronic properties than those with pure silicon-air. For example, silicon alloys that may be used include, but are not restricted to, silicon-germanium alloys $Si_xGe_{1-x}$, $0<x<1$, silicon-carbide alloys $Si_xC_{1-x}$, $0<x<1$, silicon-tungsten alloys, silicon-nickel alloys, silicon-titanium alloys, silicon-chromium alloys, silicon-aluminum alloys and silicon-molybdenum alloys. These alloys facilitate changes in the electronic band gap as well as the photonic band gap of the periodic composite. In this way electrical and optical properties of the material can be tailored for specific device applications.

The resulting luminescence and lasing characteristics of light emitting species near a complete three-dimensional photonic band edge are expected to be quite striking (see S. John and T. Quang, Physical Review Letters 74, 3419 (1995)). Important low threshold all-optical switching effects (see S. John and T, Quang, Physical Review Letters 78, 1888 (1997)), anomalous nonlinear optical response (see S. John and T. Quang, Physical Review Letters 76, 2484 (1996)), and coherent control of radiative dynamics are contemplated (see M. Woldeyohannes and S. John, Physical Review A 60, 5046 (1999)). In this regard, it is useful to explore self-assembly synthetic methods for creating diamond lattice templates from which a considerably larger PBG may be achieved, see K. M. Ho, C. T. Chan and C. M. Soukoulis, Phys. Rev. Lett. 65, 3152 (1990). It is also of considerable importance to generalize the template formation procedure, to engineer wave-guide channels and specified point defects through which and between which light can flow. Methods of soft lithography as disclosed in Y. Xia and G. M. Whitesides, Angew. Chem. Int. Ed. Engl. 37, 550 (1998) coupled with self-assembly may prove effective in realizing such "circuits of light".

The achievement disclosed herein of a periodic silicon-air composite material with a complete photonic bandgap realizes a long standing goal in photonic materials research and opens a new door for complete control of radiative emission from atoms and molecules, light localization and the integration of micron scale photonic devices into a three-dimensional all-optical micro-chip. The inverse silicon opals grown by the method disclosed herein, which may form the basis of photonic circuit elements, may be grown with a variety of geometries, shapes or morphologies including fibers, films, spheres, lithographic patterns and monoliths from microsopic to macroscopic dimensions. For example, the opals may be grown with dimensions in a range from 2×2×2 unit cells to a×b×c unit cells, wherein 2<a<10,000, 2<b<10,000, 2<c<10,000.

Three dimensional inverse silicon opals may be grown having a planar thin film geometry with dimensions in a range from 1×2×2 unit cells to a×b×c unit cells, wherein 1<a<100, 10<b, c<100,000.

The method of producing the periodic silicon-air composites starting with silica opals and producing the inverse opals therefrom is a preferred or best mode known at present since the periodicity of the opal can be efficiently transferred to the inverse opal. However, those skilled in the art will appreciate that synthesis of periodic silicon-air composites or variants thereof as disclosed herein will not be restricted to conversion of silica opals. Other silica templates and non-silica templates may be employed. Silica templates involving lattice structures other than the close packed face center cubic lattice may be used and templates using two or more different sphere sizes may be used. These include for example the hexagonal close packed structure, the body center cubic structure, the diamond lattice structure, the hexagonal $AB_2$ structure. Non-silica templates include periodically arrrayed block co-polymers and other self-assembling organic materials. In this case non-spherical, repeating units can be realized. Here a multi-stage infiltration process is required since the polymeric material may not withstand the high temperatures required for silicon CVD. Therefore, a material such as silica would be infiltrated into the polymer template and the polymer template will be removed, prior to the final infiltration with silicon and the final removal of silica.

Those skilled in the art will understand that silicon photonic crystals grown by the present method, not having a complete PBG but only a photonic pseudo-gap, that is to say a material for which there is a large suppression in the total photon density of states (DOS) from what it would be in either air or in bulk silicon, have important applications as well. From theoretical studies (see S. John and T. Quang, Physical Review Letters 78, 1888 (1997)), it is known that even a sharp drop in the DOS by a factor of 2 over a small frequency range would lead to novel optical switching devices. The same holds true for materials grown by the present method, which do not exhibit a complete photonic band gap in the total density of states, but only a complete photonic band gap in the local photon density of states. In particular, the local density of states (LDOS) controls the rate of spontaneous emission of light from atoms and molecules at particular locations in the photonic crystal, for lasing and optical switching applications. The pseudogap material encompasses a broader range of materials and composites than the rather restricted set of materials which exhibit a complete PBG. Likeswise, materials with a complete gap or pseudogap in the LDOS encompass an even broader range of materials than those which exhibit corresponding gaps in the total density of states.

The LDOS is the density of states as felt by an atom or molecule in a particular position in the photonic crystal. As stated above, a gap in the LDOS may occur under less restrictive conditions than those required for a gap in the total DOS. For microlaser device applications, it is contemplated that low threshold laser action may be achieved with a gap only in the LDOS where the light emitting atoms are actually situated. The LDOS is what actually controls the radiative dynamics of individual atoms and molecules. Finally, it should be noted that whereas the total DOS may only have a gap of only 10% In a silicon inverse opal with a "complete 3-d PBG", the LDOS may exhibit a gap of up to 20% in the same material.

Certain silicon-air composites comprising doped silicon are useful as sensors. The silicon may be doped silicon, n-type by doping with phosphorus or p-type silicon obtained by doping with boron. The dopant is incorporated by infiltrating the silicon in the presence of gaseous phosphenes or boranes. Such a three dimensional periodic composite material comprising silicon and a dielectric component having a dielectric constant small than a dielectric constant of silicon is treated by anodic oxidation to render it luminescent. The doped macroporous silicon crystal with controlled porosity silicon walls functions as a chemoselective sensor to discriminate optically between molecules in a mixture, depending on the diameter of the pores that grown in the silicon walls.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

We claim:

1. A three dimensional periodic composite material including silicon and at least one other dielectric component having an effective dielectric constant smaller than a dielectric constant of silicon and having a lattice periodicity ranging from about 0.28 microns to about 1.8 microns, wherein said three dimensional periodic composite material is an inverse silicon opal including air voids, said inverse silicon opal being characterized by having at least one complete photonic band gap in a total photon density of states spanning at least 5% of a center frequency of the at least one complete photonic band gap.

2. A three dimensional periodic composite material including silicon and at least one other dielectric component having an effective dielectric constant smaller than a dielectric constant of silicon and having a lattice periodicity ranging from about 0.28 microns to about 1.8 microns, wherein said composite material is an inverse silicon opal including air voids, said inverse silicon opal being characterized by having at least one complete photonic band gap in a local density of states, and wherein a ratio of said complete photonic band gap to a center frequency in the local density of states ranges from 0% to about 20%.

3. A three dimensional periodic composite material including silicon and at least one other dielectric component having an effective dielectric constant smaller than a dielectric constant of silicon and having a lattice periodicity ranging from about 0.28 microns to about 1.8 microns, wherein said periodic composite material is an inverse silicon opal including air voids having a diameter between about 0.8 to about 0.9 microns, and said inverse silicon opal having a complete photonic bandgap centered on a wavelength in a range from about 1.3 to about 1.7 microns.

4. The periodic composite material according to claim 3 wherein said dielectric component includes a silica-air or a germanium-air composite material.

5. The periodic composite material according to claim 3 wherein said low dielectric component is vacuum.

6. The periodic composite material according to claim 3 wherein said low dielectric component is air.

7. The periodic composite material according to claim 3 wherein said complete photonic bandgap is centered on a wavelength of about 1.5 microns.

8. The periodic composite material according to claim 3 wherein said complete photonic bandgap is adjustable by adjusting silicon to air ratio in said composite material.

9. The periodic composite material according to claim 3 wherein said silicon is selected from the group consisting of single crystal silicon, amorphous silicon, polycrystalline silicon, porous silicon and nanocrystalline silicon.

10. The periodic composite material according to claim 3 having dimensions in a range from 2×2×2 unit cells to a×b×c unit cells, wherein 2<a<10,000, 2<b<10,000, 2<c<10,000.

11. The periodic composite material according to claim 3 having a planar thin film geometry with dimensions in a range from 1×10×10 unit cells to a×b×c unit cells, wherein 1<a<100, 10<b, c<100,000.

12. The periodic composite material according to claim 3 wherein said silicon includes a silicon alloy.

13. The periodic composite material according to claim 3 wherein said silicon contains dopants, said dopants including magnetically sensitive dopants, electrically sensitive dopants and optically sensitive dopants.

14. The periodic composite material according to claim 13 wherein said doped silicon is selected from the group consisting of n-type silicon wherein said electrically sensitive dopant is phosphorous and p-type silicon wherein said electrically sensitive dopant is boron.

15. The periodic composite material according to claim 12 wherein said silicon alloy is selected from the group consisting of silicon-germanium alloys $Si_xGe_{1-x}$, 0<x<1, silicon-carbide alloys $Si_xC_{1-x}$, 0<x<1, silicon-tungsten alloys, silicon-nickel alloys, silicon-titanium alloys, silicon-chromium alloys, silicon-aluminum alloys and silicon-molybdenum alloys.

16. The periodic composite material according to claim 13 wherein said optically sensitive dopants luminescence in a wavelength range substantially located in or near said photonic bandgap.

17. The periodic composite material according to claim 16 wherein said dopants emit light in a wavelength range from about 1.3 microns to about 1.7 microns.

18. The periodic composite material according to claim 17 wherein said dopants are selected from the group consisting of rare earth atoms, organic dyes, inorganic dyes, organic polymers and inorganic polymers.

19. The according to claim 18 wherein said dopant is erbium.

20. The periodic composite material according to claim 3 wherein said silicon includes optically sensitive molecules adsorbed or chemically bonded to a surface thereof.

21. The periodic composite material according to claim 20 wherein said optically sensitive molecules includes one of luminescent dyes and luminescent polymers.

22. The periodic composite material according to claim 3 wherein said silicon includes hydrophilic or hydrophobic molecules adsorbed or chemically bonded to a surface thereof.

23. The periodic composite material according to claim 3 having a hexagonal close-packed or body centered cubic lattice periodicity.

24. An inverse silicon opal including close packed spherical air voids in silicon, the spherical air voids having a diameter in a range from about 0.2 to about 1.3 microns, the spherical air voids being monodisperse with a size distribution of the spherical air voids having a standard deviation in a range between about 2% to about 5%, said inverse silicon opal characterized by a complete photonic bandgap.

25. The inverse silicon opal according to claim 24 wherein said air voids have a diameter between about 0.8 to about 0.9 microns.

26. The inverse silicon opal according to claim 25 wherein said complete photonic bandgap is centered on a wavelength in a range from about 1.3 to about 1.7 microns.

27. The inverse silicon opal according to claim 24 wherein said silicon is selected from the group consisting of single crystal silicon, polycrystalline silicon, nanocrystalline silicon, porous silicon and amorphous silicon.

28. The inverse silicon opal according to claim 24 having dimensions in a range from 2×2×2 unit cells to a×b×c unit cells, wherein 2<a<10,000, 2<b<10,000, 2<c<10,000.

29. The inverse silicon opal according to claim 24 having a planar thin film geometry with dimensions in a range from 1×10×10 unit cells to a×b×c unit cells, wherein 1<a<100, 10<b, c<100,000.

30. The inverse silicon opal according to claim 24 wherein the spherical air voids having a diameter in a range from about 0.55 to about 1.3 microns.

31. The inverse silicon opal according to claim 24 wherein said complete photonic bandgap is adjustable by adjusting silicon to air ratio in said inverse silicon opal.

32. An inverse silicon opal including close packed spherical air voids in silicon, the spherical air voids having a diameter in a range from about 0.8 to about 0.9 microns said inverse silicon opal exhibiting a complete photonic bandgap centered on a wavelength in a range from about 1.3 to about 1.7 microns, the spherical air voids being monodisperse with a size distribution of the spherical air voids having a standard deviation in a range between about 2% to about 5%.

33. The inverse silicon opal according to claim 32 wherein said complete photonic bandgap is centered on a wavelength of about 1.5 microns.

34. An inverse silicon opal including close packed spherical air voids in silicon, the spherical air voids having a diameter in a range from about 0.55 to about 1.3 microns, the spherical air voids being monodisperse with a size distribution of the spherical air voids having a standard deviation in a range between about 2% to about 5%, said inverse silicon opal exhibiting a complete photonic bandgap.

35. The inverse silicon opal according to claim 34 wherein the spherical air voids have a diameter in a range from about 0.8 to about 0.9 microns and exhibiting said complete photonic bandgap centered on a wavelength in a range from about 1.3 to about 1.7 microns.

36. The inverse silicon opal according to claim 35 wherein said complete photonic bandgap is adjustable by adjusting silicon to air ratio in said inverse silicon opal.

* * * * *